(12) United States Patent
Oki

(10) Patent No.: US 6,825,796 B2
(45) Date of Patent: Nov. 30, 2004

(54) RADAR SYSTEM USING TWO-DIMENSIONAL SCANNER

(75) Inventor: Takahiko Oki, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/118,170

(22) Filed: Apr. 9, 2002

(65) Prior Publication Data

US 2002/0149512 A1 Oct. 17, 2002

(30) Foreign Application Priority Data

Apr. 16, 2001 (JP) ........................................ 2001-116525
Aug. 15, 2001 (JP) ........................................ 2001-246416
Dec. 7, 2001 (JP) ........................................ 2001-374742

(51) Int. Cl.[7] ............................................ G01S 13/93
(52) U.S. Cl. ............................ 342/70; 342/74; 342/75; 342/81; 342/90
(58) Field of Search ..................... 342/70–72, 74–75, 342/81–82, 89, 90, 158

(56) References Cited

U.S. PATENT DOCUMENTS 4,119,938 A * 10/1978 Alais ............................ 367/87
4,908,615 A * 3/1990 Bayraktaroglu ............. 340/917
4,916,536 A * 4/1990 Kerr et al. .................. 348/139
5,477,224 A * 12/1995 Sinnock ......................... 342/5
5,870,180 A * 2/1999 Wangler ..................... 356/4.01
6,377,207 B1 * 4/2002 Solheim et al. ............. 342/351
2002/0064341 A1 * 5/2002 Fauver et al. ................. 385/25

FOREIGN PATENT DOCUMENTS

JP          9-101474        4/1997

* cited by examiner

Primary Examiner—Thomas H. Tarcza
Assistant Examiner—Isam Alsomin
(74) Attorney, Agent, or Firm—McDermott, Will & Emery

(57) ABSTRACT

A radar apparatus comprises a signal transmitter device that transmits a signal, a scanner that two-dimensionally scans a target object using the signal transmitted from the signal transmitter device by engaging in longitudinal oscillation and lateral oscillation, a signal receiver device that receives a reflection signal of a signal transmitted via the scanner and a control device that controls a longitudinal oscillation signal and a lateral oscillation signal used to oscillate the scanner longitudinally and laterally in correspondence to the length of time over which a scanning observation is performed through a two-dimensional scan.

11 Claims, 27 Drawing Sheets

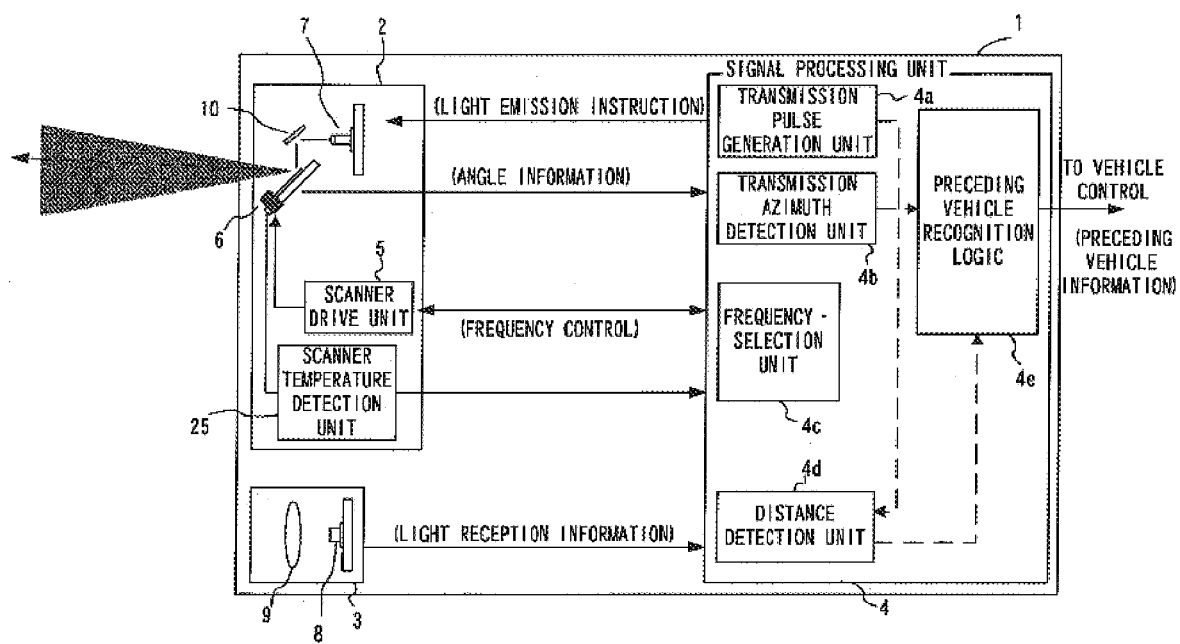

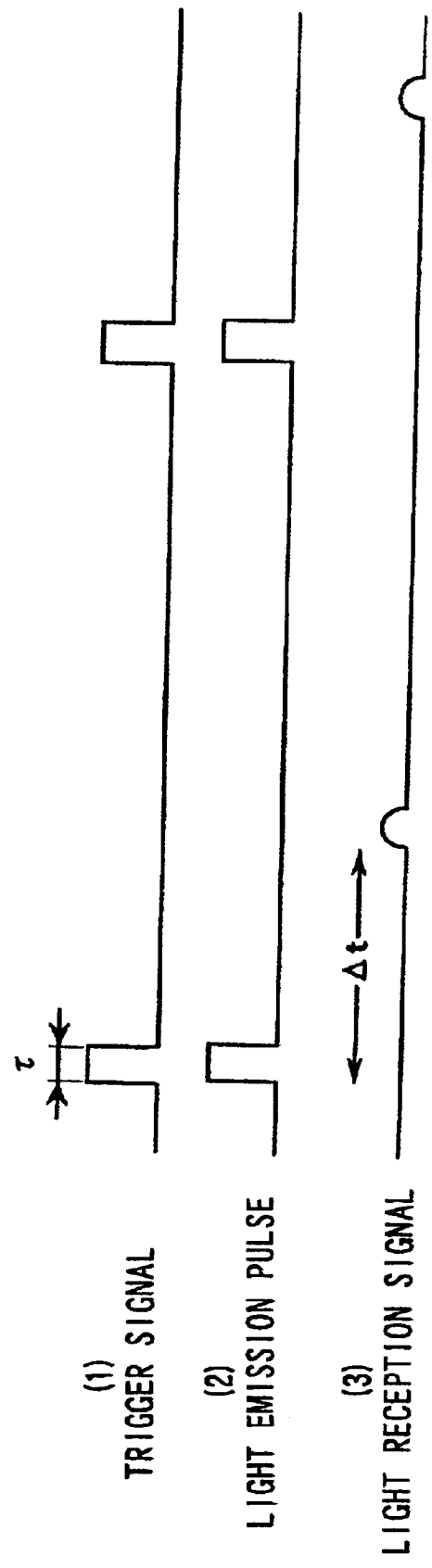

MIRROR SURFACE SIDE

REAR SURFACE SIDE

HARD SPRING EFFECT

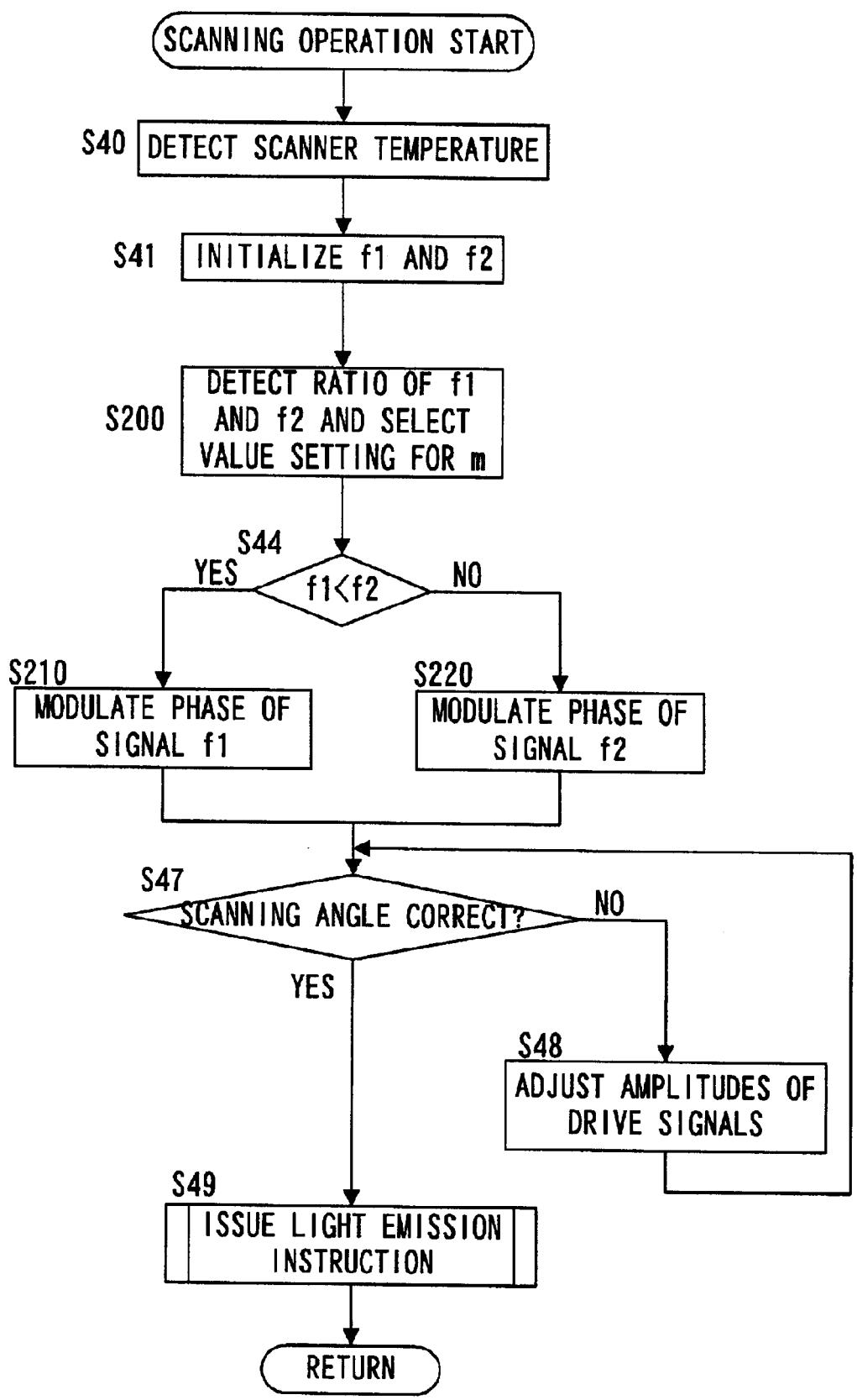

SCANNER FRONT SURFACE (MIRROR SURFACE)

SCANNER REAR SURFACE
(MAGNETOSTRICTIVE FILM-SIDE SURFACE)

● MEASUREMENT POINTS

● MEASUREMENT POINTS

RADAR SYSTEM USING TWO-DIMENSIONAL SCANNER

BACKGROUND OF THE INVENTION

1. Field of the Invention

The present invention relates to a radar apparatus that detects the distance to and the shape of an obstacle or a preceding car present around a vehicle by employing a two-dimensional scanner.

2. Description of the Related Art

A two-dimensional scanner such as the micro-scanner disclosed in Japanese Laid-Open Patent Publication No. H 9-101474 is employed in a radar apparatus in the related art. Since the mirror of the scanner is driven in response to a sine wave signal when such a two-dimensional scanner is utilized, a sinusoidal Lissajous scanning is performed instead of a linear raster scanning. The results of a scanning operation performed through Lissajous scanning are presented in FIGS. 26 and 27.

SUMMARY OF THE INVENTION

As illustrated in FIG. 26, the measurement points within an area scanned through Lissajous scanning may not always be distributed uniformly, i.e., there may be an area over which measurement points are set sparsely and an area where measurement points are set densely, depending upon the relationship between the longitudinal oscillation frequency and the lateral oscillation frequency at which the scanner is caused to oscillate. Since the area where the measurement points are sparse does not remain unchanged and moves within the scanning area as the phases of the wavelengths of the longitudinal oscillation and the lateral oscillation change, the adoption of the Lissajous scan in a radar apparatus (range finder apparatus), which is required to provide consistent measurement results, has been considered problematic. In addition, depending upon the relationship between the longitudinal oscillation frequency and the lateral oscillation frequency, a standing wave may be generated, as shown in FIG. 27. In such a case, the area over which the measurement points are set sparsely expands if the frequency of the standing wave is low, resulting in a problem in that the area where the measurement can be performed becomes smaller.

An object of the present invention is to provide a radar apparatus that does not allow formation of an area where measurement points are sparse within the scanning area and thus is capable of performing a uniform observation of the scanning area by controlling a longitudinal oscillation signal and a lateral oscillation signal in correspondence to the length of time over which the scanning observation is performed.

The radar apparatus according to the present invention comprises a signal transmitter device that transmits a signal, a scanner that two-dimensionally scans a target object using the signal transmitted from the signal transmitter device by engaging in longitudinal oscillation and lateral oscillation, a signal receiver device that receives a reflection signal which is originally transmitted via the scanner and a control device that controls a longitudinal oscillation signal and a lateral oscillation signal used to oscillate the scanner longitudinally and laterally in correspondence to the length of time over which a scanning observation is performed through two-dimensional scanning.

BRIEF DESCRIPTION OF THE DRAWINGS

FIG. 1 shows the structure achieved in a first embodiment of the radar apparatus according to the present invention;

FIG. 2 shows the timing of the light pulse transmission/reception signals;

FIG. 23 presents a flowchart of the control procedure implemented in the fifth embodiment of the radar apparatus;

DETAILED DESCRIPTION OF THE PREFERRED EMBODIMENTS

First Embodiment

Figure 3A:
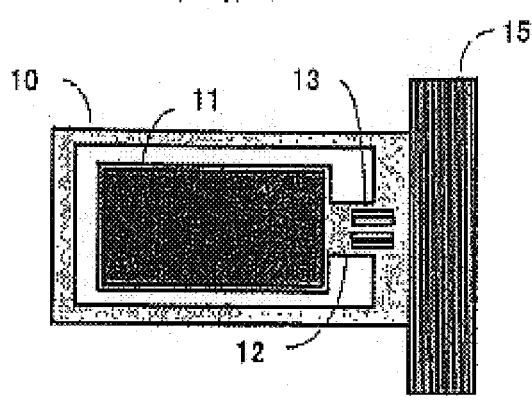
FIG. 3A shows the front surface of a single-strut support type micro-scanner and FIG. 3B shows the rear surface of the same scanner.

The radar apparatus achieved in the first embodiment is now explained in reference to FIGS. 1~6. The radar apparatus may be a laser radar which uses infrared light or a radio radar that uses electromagnetic waves. The radar operation may be performed through a pulse method or a CW method. In the pulse method, a brief pulse signal is transmitted and the length of time elapsing until the pulse signal, having been reflected by a target, comes back is measured to calculate the distance to the target. In the CW method, a continuous wave performed with a frequency modulation and an amplitude modulation using a triangular wave is transmitted and the distance is calculated in conformance to the displacement occurring in the frequency or the phase of the reflected signal. The following is an explanation of an example in which an optical scanner is utilized in an infrared laser radar apparatus to perform a radar operation through the pulse method.

FIG. 1 shows the structure achieved in the first embodiment of the radar apparatus according to the present invention. A radar apparatus 1 includes a signal transmitter unit 2, a signal receiver unit 3 and a signal processing unit 4. The signal transmitter unit 2 is provided with a scanner drive unit 5, a scanner 6, a laser diode 7, a reflecting mirror 10 and a scanner temperature detection unit 25. Infrared laser light (hereafter referred to as laser light) emitted from the laser diode 7 enters the mirror surface of the scanner 6 via the reflecting mirror 10. The scanner drive unit 5 two-dimensionally scans the laser light by causing the scanner 6 to oscillate longitudinally and laterally. The scanner 6 and the scanner drive unit 5 are to be described in further detail later. The scanner temperature detection unit 25 detects the temperature of the scanner 6. The detected temperature is then used when correcting the resonance frequency.

The signal receiver unit 3 is provided with a photodiode 8 and an optical lens 9. The laser light transmitted from the signal transmitter unit 2 is reflected at a target and is then received at the photodiode 8 via the optical lens 9. Once the reflected laser light is received at the photodiode 8, a signal indicating that the reflected laser light has been received is transmitted to a distance detection unit 4d in the signal processing unit 4.

The signal processing unit 4, which is provided with a CPU, a ROM, a RAM and the like, also includes a transmission pulse generating unit 4a, a transmission azimuth detection unit 4b, a frequency selection unit 4c, the distance detection unit 4d and a preceding vehicle recognition logic unit 4e to achieve the required internal function. The signal processing unit 4 calculates the distance to the target, the azimuth and the shape of the target and the like. Based upon the time lag manifesting after a signal for allowing the laser diode 7 in the signal transmitter unit 2 to emit laser light is transmitted until the signal indicating the reception of the returning laser light having been reflected by the target at the photodiode 8 is provided to the signal processing unit 4, the distance detection unit 4d calculates the distance to the target. During the distance calculation, a correction is made by taking into consideration the delays occurring in the signal transmission/reception within the circuit.

FIG. 2 shows and the timing relationship among a trigger signal (light emission instruction) transmitted from the signal processing unit 4 in order to allow the laser diode 7 to emit laser light, a light emission pulse emitted from the laser diode 7 and a light reception signal generated when the photodiode 8 receives the reflected light. When the trigger signal achieving a pulse width τ is transmitted to the signal transmitter unit 2 from the transmission pulse generating unit 4a in the signal processing unit 4, the laser diode 7 at the signal transmitter unit 2 emits infrared pulse light (hereafter referred to as pulse light) with the pulse width τ along a specific direction in synchronization with the trigger signal. If a target is present, the pulse light thus emitted is reflected by the target and is received at the photodiode 8 through the optical lens in the signal receiver unit 3. The distance D between the radar apparatus and the target is calculated through the following formula (1) with Δt representing the length of time elapsing after the pulse light emission until the reflected light is received and c representing the speed of the light.

$$D = c \cdot \Delta t / 2 \qquad (1)$$

The transmission azimuth detection unit 4b calculates the target azimuth by detecting the laser light emission azimuth based upon the angle of the mirror surface within the scanner 6 when the signal for allowing the laser diode 7 to emit laser light is transmitted. The pulse light is transmitted and received a predetermined number of times with the pulse light emitted along varying directions by driving the scanner 6 with the scanner drive unit 5 in the signal transmitter unit 2. At this time, some of the pulse light emitted by the signal transmitter unit 2 may not be reflected due to the absence of a target. Accordingly, the target azimuth is calculated based upon the angle of the mirror surface at the scanner 6 at the point in time corresponding to the emission of the pulse light reflected by the target and received at the signal receiver unit 3.

The frequency selection unit 4c sets the frequencies of the longitudinal drive signal and a lateral drive signal used to drive the scanner 6. The frequency selection unit 4c transmits a frequency control signal conforming to the frequencies thus set to the scanner drive unit 5. The scanner drive unit 5 drives the scanner 6 in conformance to the frequency control signal. The method adopted to set the frequencies is to be detailed later. The preceding vehicle recognition logic 4e identifies the preceding vehicle using a vehicle recognition logic or the like based upon two-dimensional information indicating the distance to and the azimuth of the target obtained through two-dimensional scanning performed with the scanner 6 within a predetermined length of observation period. Preceding vehicle information, obstacle information or the like thus obtained is transmitted to a vehicle-side CPU constituting an ACC (adaptive cruise control) controller that implements preceding vehicle follow-up control so as to achieve a preset distance between the vehicle at which the radar apparatus is mounted and the preceding vehicle.

Figure 3B:
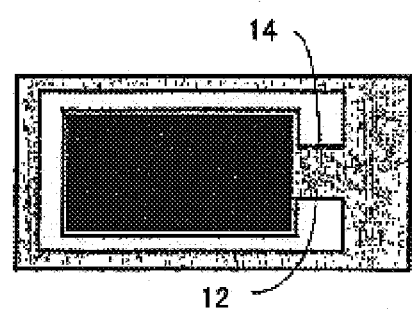

Now, in reference to FIGS. 3A and 3B, the structure adopted in the scanner 6 is explained. FIGS. 3A and 3B shows the structure of a single-strut support type microscanner. FIG. 3A shows the front surface at which a mirror is mounted and FIG. 3B shows the rear surface of the scanner. A mirror 11 is supported by a strut 12. At the front surface of the strut 12, a piezo-resistance film 13 whose resistance value changes as the strut 12 flexes or twists is formed. A magnetostrictive film with a uniform magnetic azimuth is formed at the rear surface of the strut 12. Factors that may cause flexure, torsion or the like at the strut 12 are to be explained later. The signal processing unit 4 calculates the extents to which the strut 12 is flexed and twisted by detecting the change in the resistance value of the piezo-resistance film 13. The angle of the mirror 11, i.e., the direction along which the pulse light is emitted, can be detected based upon the extents to which the strut 12 is flexed and twisted thus calculated.

An air-core coil 15 is wound around the strut 12. The air-core coil 15 is provided to apply an AC magnetic field to the strut 12. Supplied with an AC current, the air-core coil 15 is able to apply an AC magnetic field to the strut 12 along a direction which is offset by a predetermined angle relative to the magnetic azimuth of the magnetostrictive film 14. As a result, flexure and torsion occur at the strut 12, causing the scanner 6 to oscillate two-dimensionally along the longitudinal direction and the lateral direction.

It is to be noted that since the direction along which the AC magnetic field is applied to the strut 12 can be changed in correspondence to the direction along which the magnetostrictive film 14 is set or the direction along which the current is supplied to the air-core coil 15, it is necessary to adjust in advance the direction along which the magnetostrictive film 14 is set and the like in order to achieve the desired longitudinal oscillation and lateral oscillation. In addition, the resonance frequency of the scanner 6 is determined by the material constituting the scanner 6 and the dimensions of the scanner 6.

Figure 4:
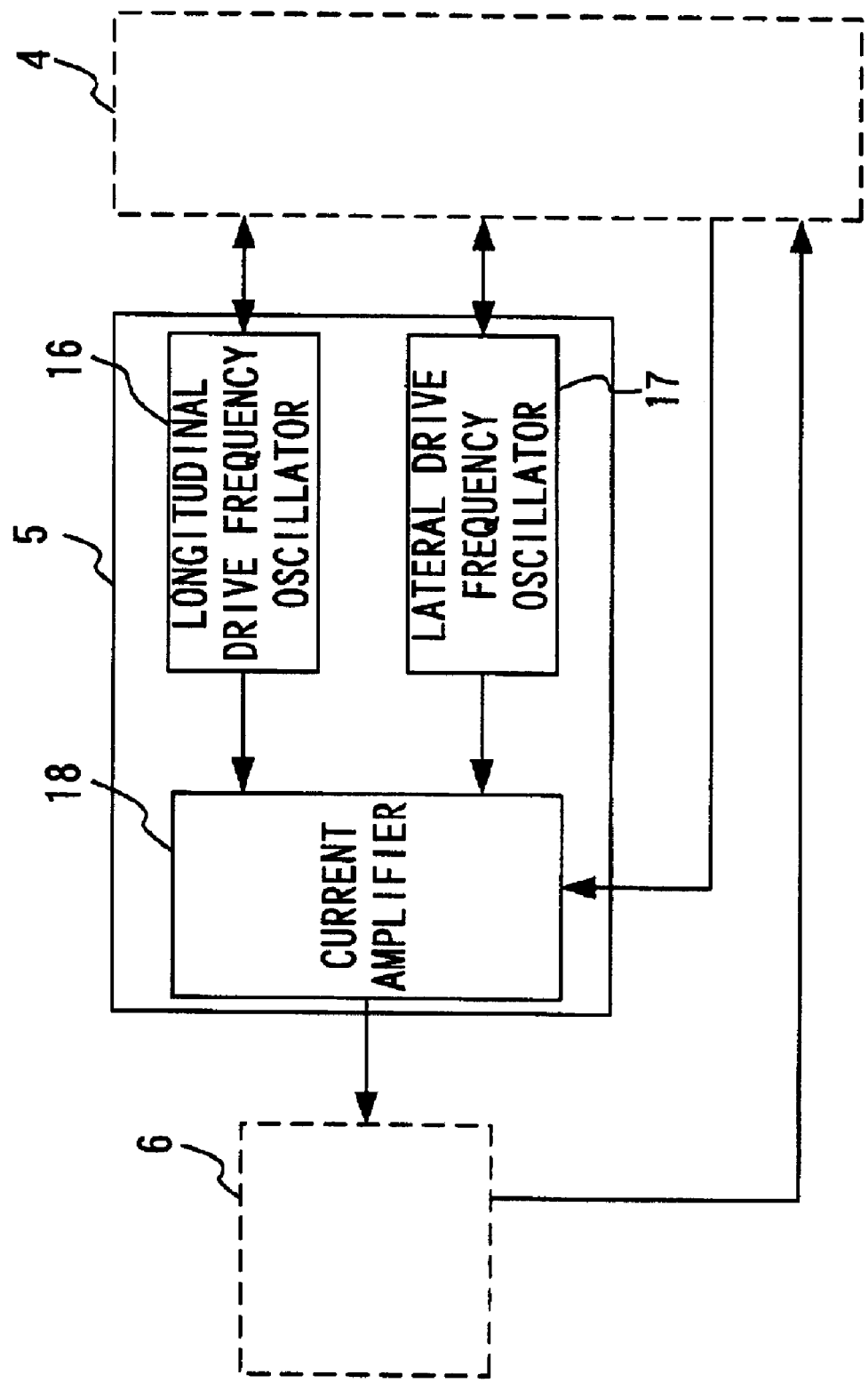
FIG. 4 shows the structure of the scanner drive unit adopted in the first embodiment of the radar apparatus according to the present invention.

FIG. 4 shows the structure assumed in the scanner drive unit 5. The scanner drive unit 5 includes a longitudinal drive signal generator 16, a lateral drive signal generator 17 and a current amplifier 18. Hereafter, the longitudinal oscillation frequency of the sine wave oscillated by the longitudinal drive signal generator 16 is referred to as a longitudinal drive frequency and the lateral oscillation frequency of the sine wave oscillated by the lateral drive signal generator 17 is referred to as a lateral drive frequency. The sine waves with the longitudinal drive frequency f1 and the lateral drive frequency f2 oscillated by the longitudinal drive signal generator 16 and the lateral drive signal generator 17 are individually output to the current amplifier 18 in response to a control signal input from the signal processing unit 4. The current amplifier 18 individually amplifies the signal with the drive frequencies input thereto at respective amplification rates provided by the signal processing unit 4. The amplified signals are then added together and the resulting signal is applied to the air-core coil 15 in the scanner 6.

The longitudinal and lateral drive frequencies of the sine waves oscillated by the longitudinal drive frequency oscillator 16 and the lateral drive signal generator 17 are initially set at frequency levels close to the resonance frequency of the scanner 6. This resonance frequency may be the resonance frequency of the primary resonance, the secondary resonance or the like at the scanner 6. By issuing a command to the scanner drive unit 5, the signal processing unit 4 implements control on the frequencies so that the cycles of the beats of the wave motion with the longitudinal drive frequency f1 and the wave motion with the lateral drive frequency f2, both set to the initial levels, achieve values which is 1/integer of the scanning observation period T over which the pulse light is transmitted and received over a predetermined number of times. In the specific example explained below, control is implemented so as to satisfy the relationship expressed in expression (2). m and n in the expression are relatively prime.

$$|m \cdot f1 - n \cdot f2| = 1/T \qquad (2)$$

The integers m and n in expression (2) above do not need to be relatively prime. However, unnecessary overlapping of observation points may occur if they are not. Thus, by selecting prime integers for m and n, the cycles of the beats of the wave motion with the longitudinal drive frequency f1 and the wave motion with the lateral drive frequency f2 can be set equal to 1/integer of the observation period T, which minimizes overlapping of observation points. For this reason, an explanation is given below by assuming that m and n are relatively prime.

Figure 5:
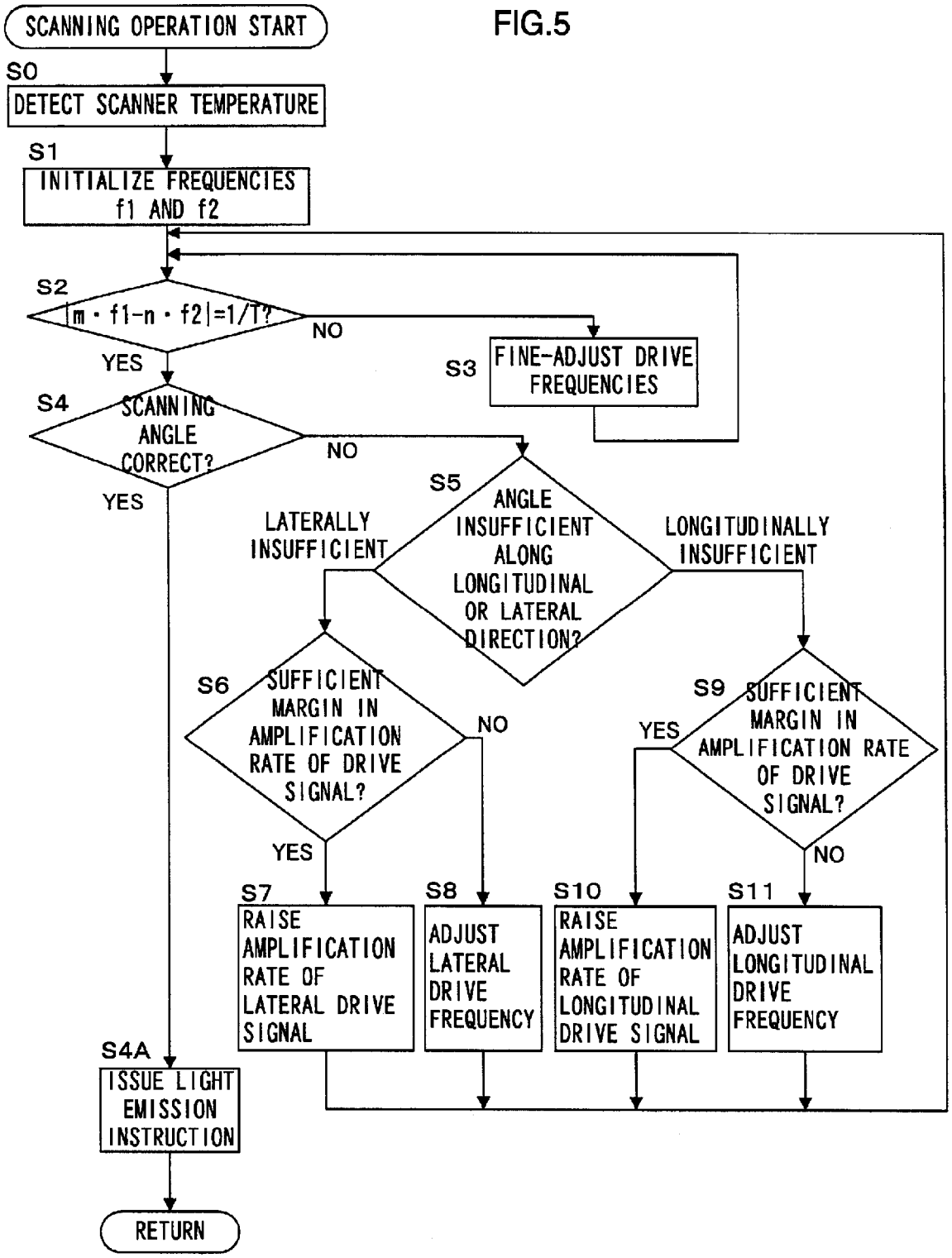
FIG. 5 presents a flowchart of the control procedure from the start of the scanning operation to transmission of a light emission pulse executed in the radar apparatus according to the present invention.

FIG. 5 presents a flowchart of the control procedure executed in the signal processing unit 4 in the radar apparatus according to the present invention. The following is an explanation of the procedure given in conformance to the sequence of the control starting in step S0. The processing in step S0 and subsequent steps is started in response to an input of a scanning start instruction signal to the signal processing unit 4.

In step S0, the temperature of the scanner 6 is detected by the scanner temperature detection unit 25. Once the temperature of the scanner 6 is detected, the operation proceeds to step S1. In step S1, the longitudinal drive frequency f1 and the lateral drive frequency f2 are both set to their initial frequency levels close to the resonance frequency of the scanner 6. The resonance frequency has been corrected in conformance to the temperature of the scanner 6.

Now, the reason for correcting the resonance frequency in conformance to the temperature of the scanner 6 is explained. The resonance frequency of the scanner 6 may shift due to a change in the temperature in the vicinity of the scanner 6. In other words, a change in the temperature at the scanner 6 may cause a change in the resonance frequency of the scanner 6, resulting in a reduction in the size of the scanning area (observation area). In order to prevent this from occurring, a correction is made on the resonance frequency by factoring in the change in the resonance frequency corresponding to the change occurring in the temperature based upon the temperature of the scanner 6 detected in step S0. The relationship between the change in the temperature of the scanner 6 and the change in the resonance frequency is ascertained in advance through testing or the like. Thus, any reduction in the scanning area caused by a change in the temperature of the scanner 6 can be prevented.

In step S2, it is judged as to whether or not the longitudinal drive frequency f1 and the lateral drive frequency f2 achieve the relationship indicated in expression (2), i.e., the relationship expressed as $|m \cdot f1 - n \cdot f2| = 1/T$ (m and n are relatively prime). If it is judged that the relationship in expression (2) is not achieved, the operation proceeds to step S3.

In step S3, a command for adjusting the individual drive frequencies so that the longitudinal drive frequency f1 and the lateral drive frequency f2 achieve the relationship in expression (2) is transmitted to the scanner drive unit 5 in the signal transmitter unit 2 before the operation returns to step S2. In response to the command, the scanner drive unit 5 controls the longitudinal drive signal generator 16 and the lateral drive signal generator 17 so that the longitudinal drive frequency f1 and the lateral drive frequency f2 achieve the relationship expressed in expression (2).

If it is judged in step S2 that the relationship in expression (2) is achieved, the operation proceeds to step S4. In step S4, it is judged as to whether or not the direction along which the pulse light is emitted, i.e., the scanning angle, is correct. This judgment may be made by detecting the resistance value of the piezo-resistance film 13. If it is judged that the scanning angle is correct, the operation proceeds to step S4A to transmit a light emission instruction to the laser diode 7 in the signal transmitter unit 2. Upon receiving the light emission instruction, the laser diode 7 emits pulse light, thereby starting a two-dimensional scan. If, on the other hand, it is judged that the scanning angle is not correct, the operation proceeds to step S5.

In step S5, it is judged as to whether the scanning angle is insufficient along the longitudinal direction or the lateral direction. If it is judged that the scanning angle is insufficient along the lateral direction, the operation proceeds to step S6. In step S6, it is judged as to whether or not there is a sufficient margin in the amplification rate of the drive signal. If it is judged that there is a sufficient margin, the operation proceeds to step S7, whereas if it is judged that there is not sufficient margin, the operation proceeds to step S8. In step S7, to which the operation proceeds after judging that there is a sufficient margin in the amplification rate, a signal for increasing the amplification rate of the lateral drive signal is transmitted to the current amplifier 18 in the scanner drive unit 5. Upon receiving this signal, the current amplifier 18 increases the amplification rate of the lateral drive signal. In other words, the amplification rate of the AC signal applied to the air-core coil 15 is increased, and then the operation returns to step S2. Since the size of the resonant oscillation is in proportion to the level of the AC current applied to the air-core coil 15, the insufficient scanning angle along the lateral direction can be compensated by increasing the amplification rate of the AC current. In step S8, to which the operation proceeds after judging that there is not a sufficient margin in the signal amplification rate, on the other hand, the insufficient scanning angle along the lateral direction is compensated by adjusting the lateral drive frequency f2. Once the lateral drive frequency f2 is adjusted, the operation returns to step S2.

If it is judged that the scanning angle is insufficient along the longitudinal direction, the operation proceeds to step S9. In step S9, it is judged as to whether or not there is a sufficient margin in the amplification rate of the drive signal. If it is judged that there is a sufficient margin, the operation proceeds to step S10, whereas if it is judged that there is not sufficient margin, the operation proceeds to step S11. In step S10, to which the operation proceeds after judging that there is a sufficient margin in the amplification rate, a signal for increasing the amplification rate of the longitudinal drive signal is transmitted to the current amplifier 18 of the scanner drive unit 5. Upon receiving this signal, the current amplifier 18 increases the amplification rate of the longitudinal drive signal. In other words, the amplification rate of the AC signal applied to the air-core coil 15 is increased, and then the operation returns to step S2. The insufficient scanning angle along the longitudinal direction can be compensated in this manner for the reason explained previously. In step S11, to which the operation proceeds after judging that there is not a sufficient margin in the signal amplification, on the other hand, the insufficient scanning angle along the longitudinal direction is compensated by adjusting the longitudinal drive frequency f1. Once the longitudinal drive frequency f1 is adjusted, the operation returns to step S2.

In the control described above, in which the longitudinal drive frequency f1 and the lateral drive frequency f2 at the scanner 6 are set so that they achieve the relationship in expression (2), i.e., the relationship expressed as $|m \cdot f1 - n \cdot f2| = 1/T$, the cycles of the beats constituted of the wave motion with the longitudinal drive frequency f1 and the wave motion with the lateral drive frequency f2 are set equal to 1/integer of the observation period T. As a result, it becomes possible to achieve a two-dimensional observation within the two-dimensional scanning area in which the observation points are set uniformly without creating an area where observation points are set sparsely or densely.

The resonance frequency of the scanner 6 may shift due to a change in the temperature in the vicinity or the like after the pulse light is emitted from the laser diode 7 and the range finding operation starts. In such a case, there is a risk of the scanning area becoming smaller, and thus, it is necessary to adjust the driving conditions for the scanner 6 in conformance to the change in the resonance frequency of the scanner 6 in order to assure that the observation is performed within a specific two-dimensional scanning area. The method adopted to implement this control is now explained in reference to the control flowchart presented in FIG. 6.

Figure 6:
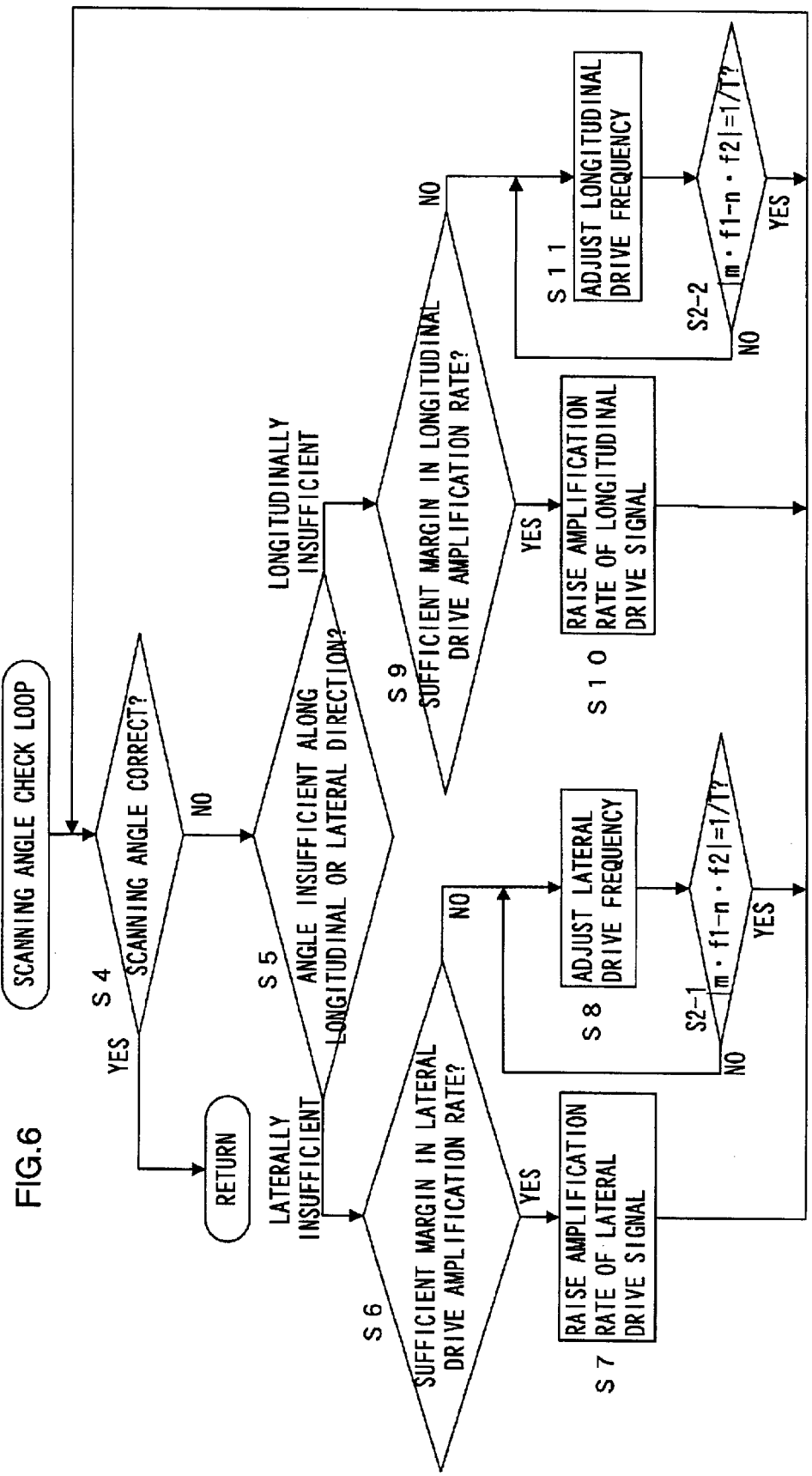
FIG. 6 presents a flowchart of the control procedure implemented when the radar apparatus according to the present invention performs a scanning angle adjustment.

Steps in which control processing similar to that in the flowchart in FIG. 5 are assigned with the same step numbers in the flowchart in FIG. 6. This control is implemented as necessary after the range finding operation starts. In other words, the range finding operation starts in response to the light emission instruction issued to the laser diode 7 in step S4A in the flowchart in FIG. 5, and the control is subsequently implemented as necessary. Accordingly, the control may be implemented over predetermined time intervals or it may be implemented before a specific control procedure is executed every time or after specific control is executed each time. The control is now explained in conformance to the sequence of the procedure, starting in step S4.

In step S4, it is judged as to whether or not the direction along which the pulse light is emitted, i.e., the scanning direction, is correct. This judgment may be made by detecting the resistance value of the piezo-resistance film 13. If it is judged that the scanning angle is correct, the range finding operation is executed continuously. If, on the other hand, it is judged that the scanning angle is not correct, the operation proceeds to step S5. Since the control procedure corresponding to step S5~step S11 is identical to the control procedure in FIG. 5, its explanation is omitted, and the following explanation focuses on the difference from the control procedure in FIG. 5.

Once the lateral drive frequency f2 is adjusted in step S8, the operation proceeds to step S2-1. In step S2-1, it is judged as to whether or not the longitudinal drive frequency f1 and the lateral drive frequency f2 achieve the relationship expressed in expression (2). If it is judged that the frequencies achieve the relationship in expression (2), the operation returns to step S4. If, on the other hand, it is judged that the relationship in expression (2) is not achieved, the operation returns to step S8 to adjust the lateral drive frequency f2 again.

Once the longitudinal drive frequency f2 is adjusted in step S11, the operation proceeds to step S2-2. In step S2-2, it is judged as to whether or not the longitudinal drive frequency f1 and the lateral drive frequency f1 achieve the relationship indicated in expression (2). If it is judged that the frequencies achieve the relationship in expression (2), the operation returns to step S4. If, on the other hand, it is judged that the relationship in expression (2) is not achieved, the operation returns to step S11 to adjust the longitudinal drive frequency f1 again.

In the control described above, it is judged as to whether or not the longitudinal drive frequency f1 and the lateral drive frequency f2 achieve the relationship indicated in expression (2) as appropriate even if the resonance frequency of the scanner 6 fluctuates after the range finding operation starts. Since the amplification rate or the drive frequency of a drive signal is adjusted if it is judged that the relationship in expression (2) is not achieved, an observation can be performed within a specific two-dimensional scanning area. As a result, a uniform scanning operation can be sustained without any irregularity manifesting in the two-dimensional scanning area.

It is to be noted that the control implemented in conformance to the change in the resonance frequency of the scanner 6 described above may be achieved primarily by controlling the current amplification rate, instead. However, there is a concern that heat may be generated at the coil 15 to which a raised AC current is supplied by increasing the current amplification rate. For this reason, it is necessary to individually adjust the longitudinal and lateral drive frequencies so that the risk of heat generation can be eliminated.

Second Embodiment

Figure 7:
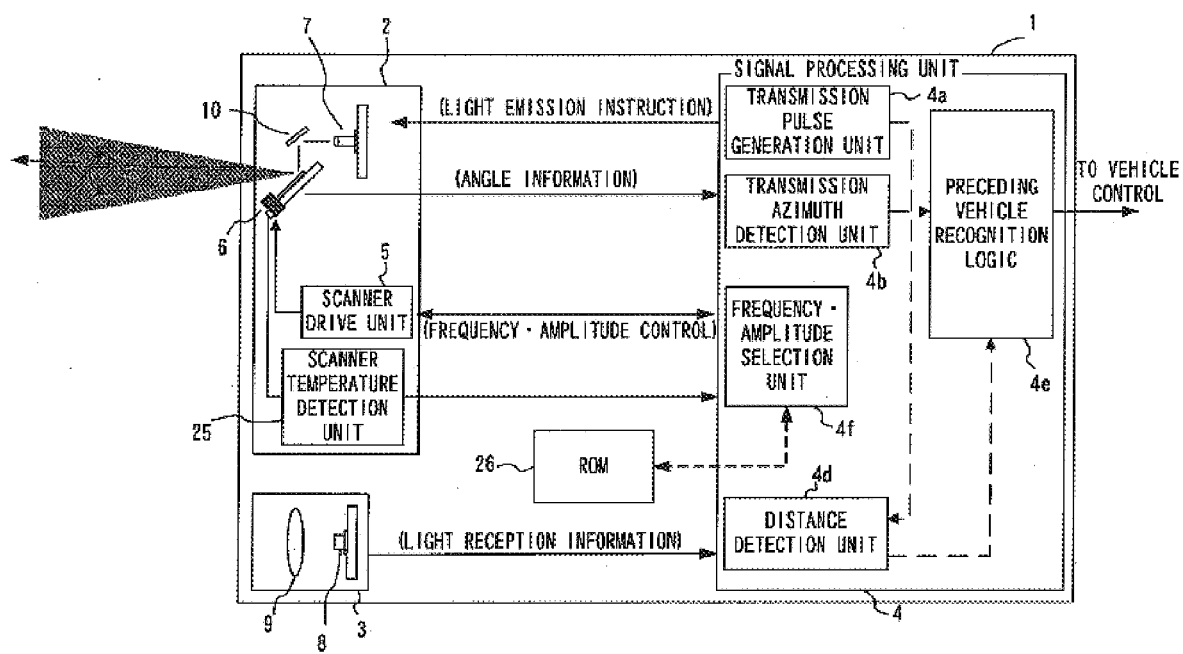
FIG. 7 shows the structure achieved in a second embodiment of the radar apparatus according to the present invention.

FIG. 7 shows the structure achieved in the second embodiment of the radar apparatus according to the present invention. A radar apparatus 1 includes a signal transmitter unit 2, a signal receiver unit 3, a signal processing unit 4 and a ROM 26. The signal processing unit 4 and the ROM 26 differentiate the radar apparatus in the second embodiment from the radar apparatus in the first embodiment. The signal processing unit 4 includes a function achieved by a frequency·amplitude selection unit 4f which corresponds to the frequency selection unit 4c in the first embodiment. The frequency amplitude selection unit 4f is capable of selecting the drive frequencies and the oscillation amplitudes at which the scanner 6 is to be driven. The ROM 26 is a ROM utilized for frequency selection, having stored therein the data indicating the relationship between the drive signal intensity and the resonance frequency so that the frequencies are selected by factoring in the hard spring effect to be explained later.

Figure 8:
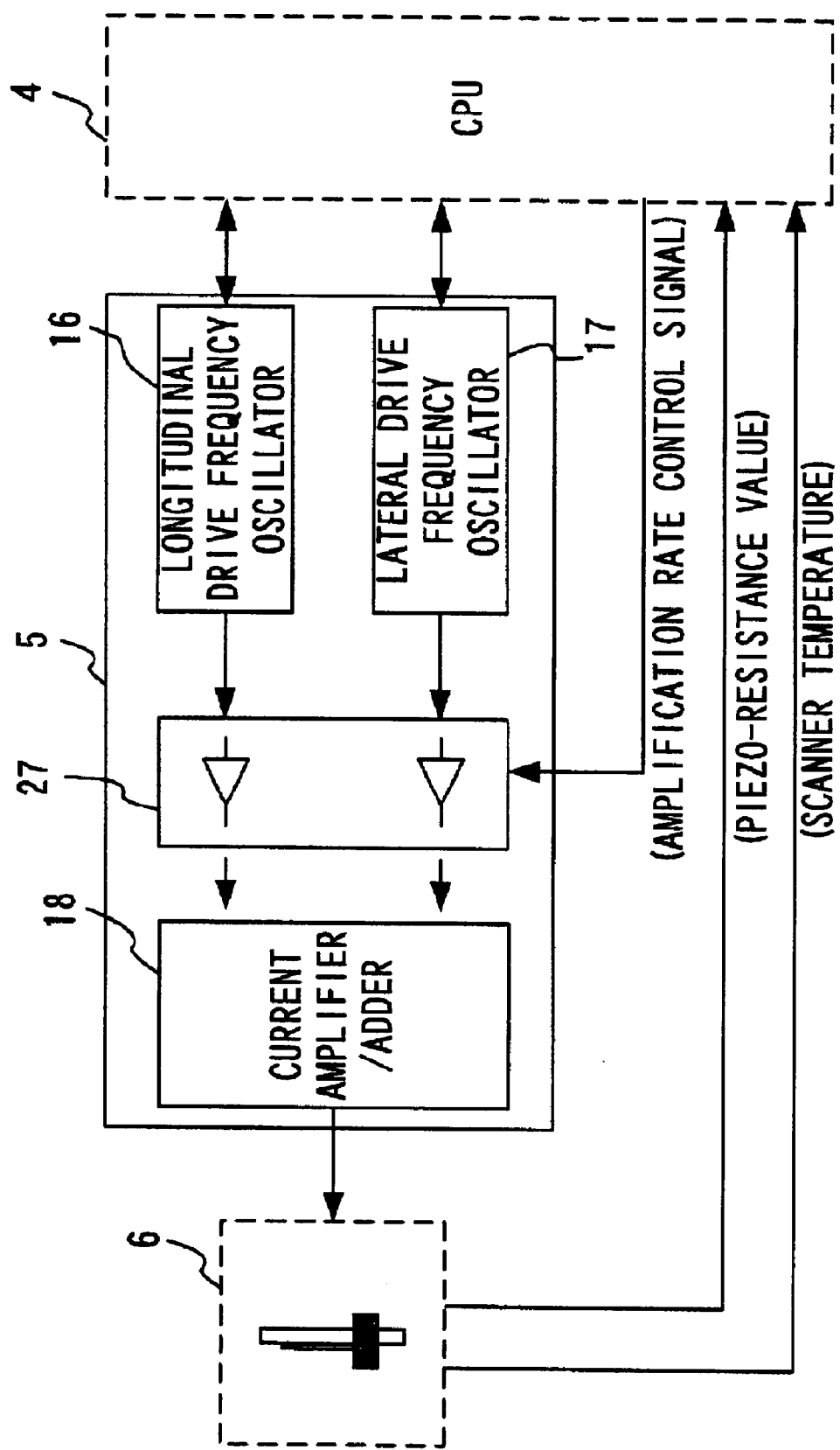
FIG. 8 shows the structure of the scanner drive unit adopted in the second embodiment of the radar apparatus according to the present invention.

FIG. 8 shows the structure assumed in a scanner drive unit 5 achieved in the second embodiment. It is differentiated from the scanner drive unit 5 in the first embodiment by its gain control amplifier 27. The gain control amplifier 27 controls the amplification rates of the longitudinal drive frequency f1 and the lateral drive frequency f2 based upon control signals from the signal processing unit 4. The signals at individual drive frequencies are amplified at the amplification rates controlled by the gain control amplifier 27 and are provided to the current amplifier 18.

Figure 9:
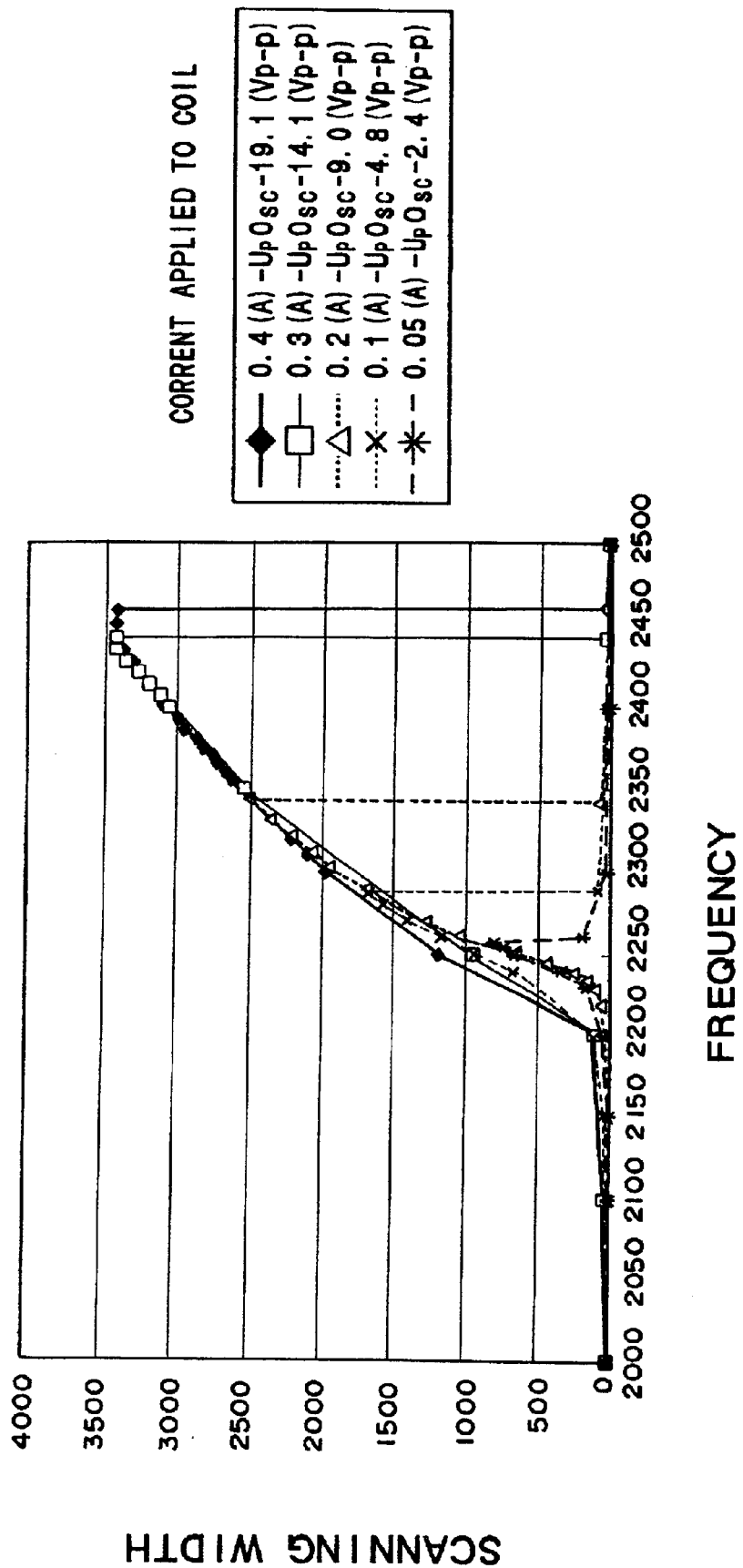
FIG. 9 shows the relationship between the scanner resonance frequency and the scanning width.

Now, the hard spring effect is explained. The resonance frequency of the micro-scanner 6 is determined in conformance to the material constituting the scanner 6 and the dimensions of the scanner 6 in a magnetic field area in which the scanning amplitude is small. However, the resonance frequency in a magnetic field area in which the scanning amplitude is large achieves a nonlinear value which changes in conformance to the intensity level of the magnetic field generated by the drive current flowing through the air-core coil 15 (see FIG. 9). The characteristics with which the resonance frequency changes in an area where an intense magnetic field is present in this manner is referred to as the hard spring effect.

If the strength of the drive signal is raised in order to control the longitudinal and lateral drive amplitudes in a magnetic field area over which the hard spring effect manifests, the resonance frequency changes as described above. In such a case, since the scanning amplitude does not change even if the drive signal intensity is increased, the desired scanning area width cannot be achieved.

In the radar apparatus in the second embodiment, a sparse area or a dense area does not exist in the scanning area even when the hard spring effect manifests in the magnetic field area, and consequently, the radar apparatus is allowed to perform a two-dimensional observation within a uniform scanning area achieving the desired scanning area width.

Figure 10:
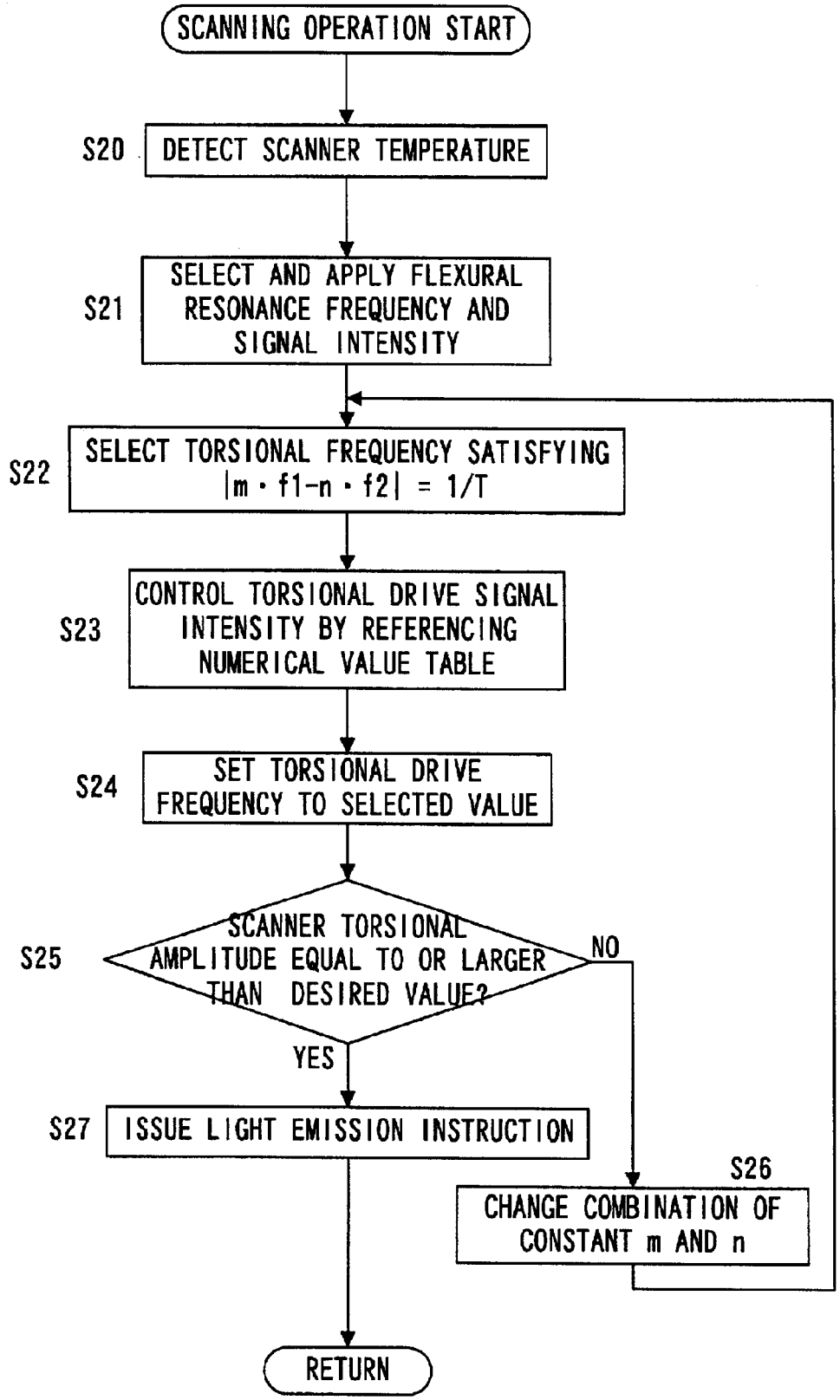
FIG. 10 presents a flowchart of the control procedure implemented in the second embodiment of the radar apparatus according to the present invention.

FIG. 10 presents a flowchart of the control procedure achieved in the second embodiment, which is implemented after the radar apparatus according to the present invention starts a scanning operation until a light emission pulse is transmitted. The following is an explanation given in conformance to the sequence of the control starting in step S20. In step S20, the temperature of the scanner 6 is detected by the scanner temperature detection unit 25. Once the temperature of the scanner 6 is detected, the operation proceeds to step S21. In step S21, a signal is applied by selecting a lateral drive frequency (flexural resonance frequency) f2 and a flexural drive signal intensity. The value of the lateral drive frequency f2 is corrected based upon the temperature of the scanner 6 detected in step S20, as in the first embodiment.

In the following step S22, a longitudinal drive frequency (torsional resonance frequency) f1 is selected so as to achieve the relationship in expression (2) explained earlier. The value of the longitudinal drive f1 frequency, too, has been corrected in conformance to the temperature of the scanner 6 detected in step S20.

$$|m \cdot f1 - n \cdot f2| = 1/T \tag{2}$$

In step S23, a torsional drive signal intensity which will achieve the longitudinal drive frequency f1 selected in step S22 is calculated based upon a mathematical formula or a numerical value table stored in the ROM 26. At this torsional drive signal intensity, the scanner is driven at a frequency lower than the resonance frequency in order to prevent the hard spring effect from manifesting in an adverse manner. Once the torsional drive signal intensity is calculated, the operation proceeds to step S24. In step S24, the longitudinal drive frequency f1 selected in step S22 is set.

In step S25, it is judged as to whether or not the oscillation amplitude attributable to the torsion of the scanner 6 indicates a value equal to or higher than a desired value. If it is judged that the value is equal to or higher than the desired value, the operation proceeds to step S27, whereas if it is judged that the value is not equal to or higher than the desired value, the operation proceeds to step S26. In step S26, the combination of the constants m and n in expression (2) is changed in order to achieve the desired oscillation amplitude before the operation returns to step S22. In step S27, the observation area is decided and a light emission instruction is issued to the laser diode 7 in the signal transmitter unit 2. Upon receiving the light emission instruction, the laser diode 7 emits pulse light, thereby starting a two-dimensional scan.

In the control described above, the relationship between the drive signal intensity and the resonance frequency at the magnetic field area where the hard spring effect manifests is stored in advance at the ROM 26 as an arithmetic operation formula or as a numerical value table. A drive signal intensity and a drive frequency are set using the arithmetic operation formula or the numerical value table and, as a result, the hard spring effect is eliminated. In other words, it becomes possible to sustain a uniform scanning operation without any irregularity manifesting in the two-dimensional scanning area to be observed.

Third Embodiment

Figure 11:
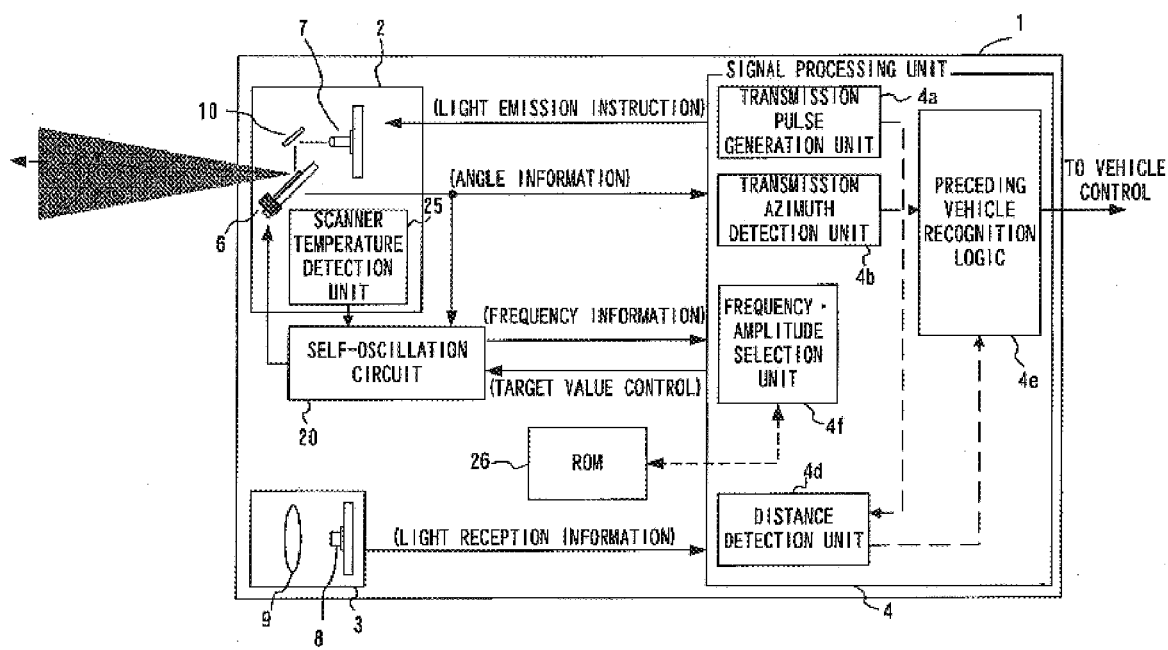
FIG. 11 shows the structure of the radar apparatus achieved in a third embodiment which employs a self-oscillation circuit.
Figure 12:
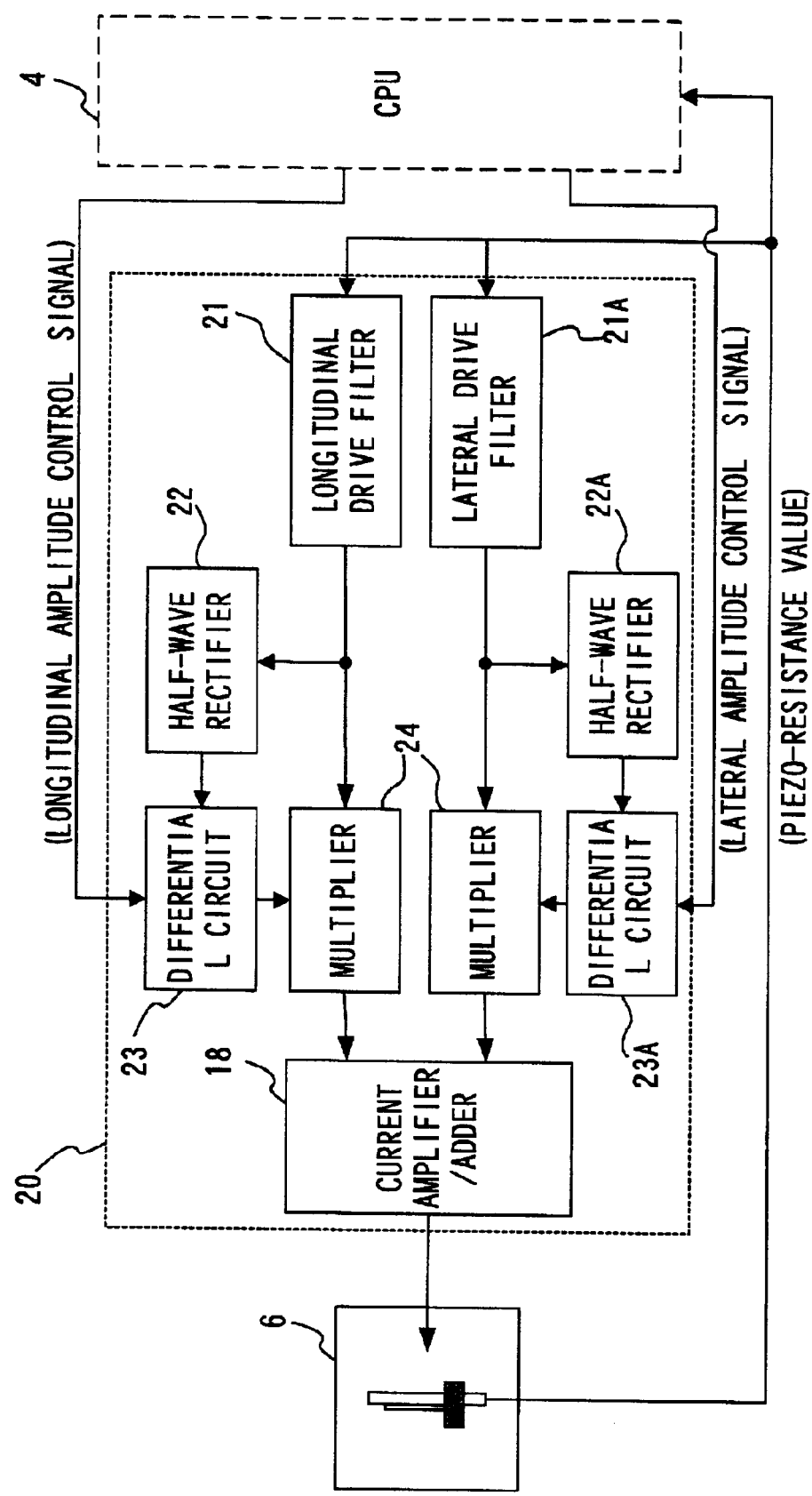
FIG. 12 shows the structure of the self-oscillation circuit.

Next, a radar apparatus which employs a self-oscillation circuit 20 as shown in FIG. 11 is explained. The self-oscillation circuit 20 automatically raises or lowers the drive signal intensity so that the oscillation amplitude of the micro-scanner achieves a predetermined targets amplitude. FIG. 12 shows the structure adopted in the self-oscillation circuit 20. A half-wave rectifier 22 detects the amplitude of the longitudinal oscillation based upon a piezo output signal (oscillation signal) from the micro-scanner 6 input via a longitudinal drive filter 21. Likewise, a half-wave rectifier 22A detects the amplitude of the lateral oscillation based upon a piezo output signal (oscillation signal) from the micro-scanner 6 input via a lateral drive filter 21A.

A differential circuit 23 outputs the difference between an amplitude signal indicating the amplitude of longitudinal oscillation input from the half-wave rectifier 22 and an amplitude control signal (target amplitude signal) for the longitudinal oscillation input from the signal processing unit 4. Likewise, a differential circuit 23A outputs the difference between an amplitude signal indicating the amplitude of the lateral oscillation input from the half-wave rectifier 22A and an amplitude control signal (target amplitude signal) for the lateral oscillation input from the signal processing unit 4.

A multiplier 24 provides signals for amplifying or attenuating the piezo signals based upon the differences between the actual amplitude signals and the target amplitude signals calculated at the differential circuits 23 and 23A to the current amplifier 18. The current amplifier 18 amplifies the longitudinal and lateral drive frequency signals at corresponding amplification rates based upon the signals input thereto. The amplified longitudinal and lateral drive frequency signals are added together with their phases offset by 90° from each other and then the resulting signal is provided to the scanner 6. By measuring in advance the phase delays occurring between the drive signals when drive is achieved by an external force and the piezo output signals and setting the extent of phase change, self-oscillation can be realized by using the piezo output signals.

Figure 13:
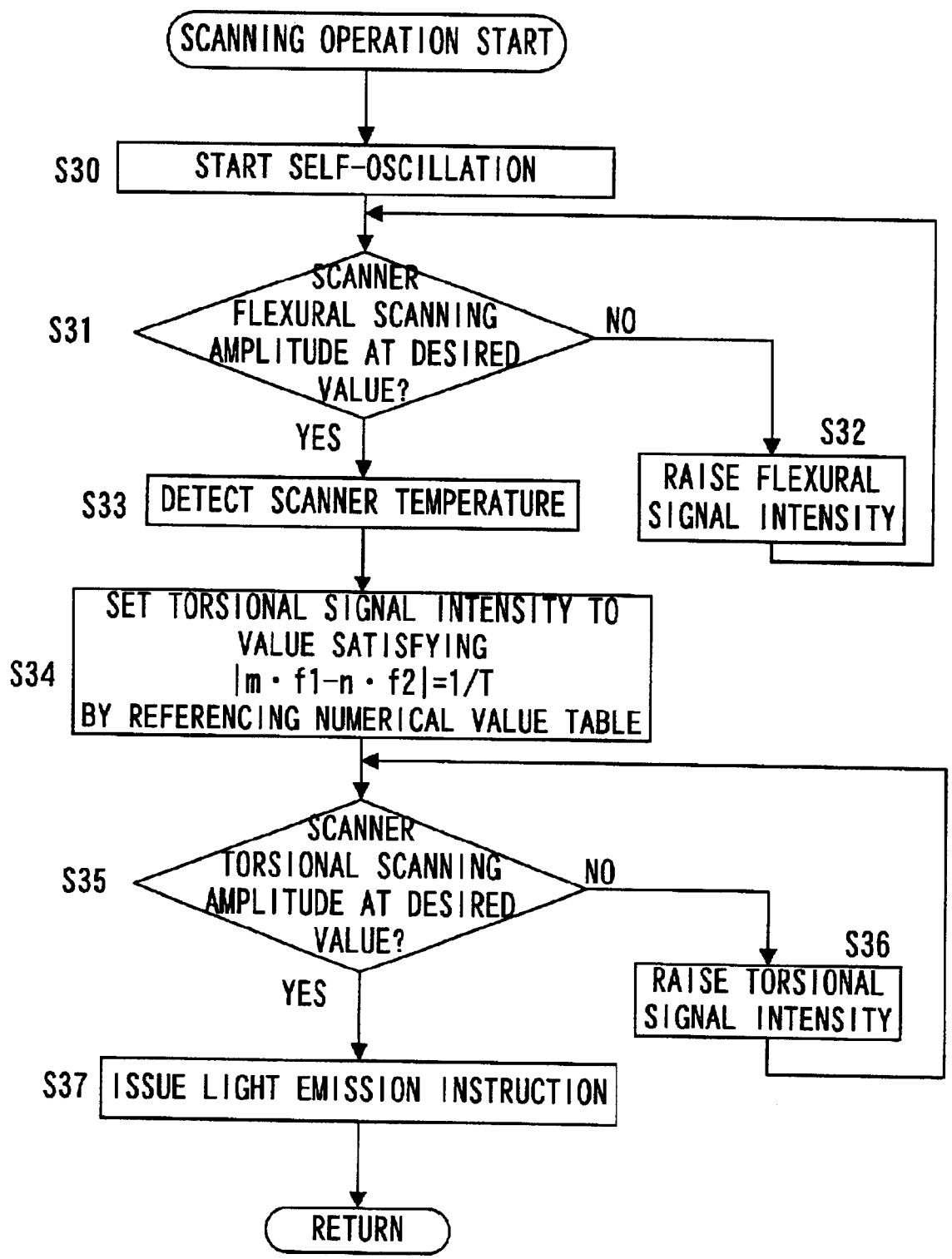
FIG. 13 presents a flowchart of the control procedure implemented in the radar apparatus which employs the self-oscillation circuit.

FIG. 13 presents a flowchart of the procedure of the control implemented after the radar apparatus employing the self-oscillation circuit 20 starts a scanning operation until a light emission pulse is emitted. The following is an explanation given in conformance to the sequence of the control starting in step S30. In step S30, a self-oscillation operation is started at the self-oscillation circuit 20 and then the operation proceeds to step S31. In step S31, it is judged as to whether or not the oscillation amplitude attributable to the flexing movement of the scanner 6 achieves a desired value. This oscillation attributable to flexure corresponds to the lateral oscillation. If it is judged that the desired amplitude value is achieved, the operation proceeds to step S33, whereas if it is judged that the amplitude value is not equal to the desired value, the operation proceeds to step S32. In step S32, the flexural signal intensity is raised before the operation returns to step S31.

Instep S33, the temperature of the scanner 6 is detected by the scanner temperature detection unit 25. Once the temperature of the scanner 6 is detected, the operation proceeds to step S34. In step S34, the torsional signal intensity is set so that the longitudinal drive frequency f1 and the lateral drive frequency f2 achieve the relationship indicated in expression (2) by referencing a mathematical formula or a numerical value table stored at the ROM 26. As in the first and second embodiments, the values of the longitudinal drive frequency f1 and the lateral drive frequency f2 have been corrected in conformance to the temperature of the scanner 6 detected in step S33.

$$|m \cdot f1 - n \cdot f2| = 1/T \qquad (2)$$

Once the torsional signal intensity is set, the operation proceeds to step S35. In step S35, it is judged as to whether or not the oscillation amplitude attributable to the torsion of the scanner 6 achieves a desired value. This oscillation attributable to the torsion corresponds to the longitudinal oscillation of the scanner 6. If it is judged that the amplitude value is equal to the desired value, the operation proceeds to step S37, whereas if it is judged that the amplitude value is not the desired value, the operation proceeds to step S36. In step S36, the torsional signal intensity is raised before the operation returns to step S35.

In step S37, a light emission instruction is issued to the laser diode 7 in the signal transmitter unit 2 after deciding the observation area. Upon receiving the light emission instruction, the laser diode 7 emits pulse light, thereby starting a two-dimensional scan.

In the control implemented in the radar apparatus employing the self-oscillation circuit, the resonance frequency is set by ensuring that the drive frequencies achieve the relationship in expression (2) in a magnetic field area over which the hard spring effect does not manifest. In a magnetic field area in which the hard spring effect manifests, the resonance frequency is changed by adjusting the target amplitude values input to the differential circuits 23 and 23A to eliminate the hard spring effect. In the flowchart presented in FIG. 13, a longitudinal oscillation frequency f1 and a lateral drive frequency f2 achieving the relationship in expression (2) are selected, and the target amplitudes to be input to the differential circuits 23 and 23A are ascertained using the mathematical formula or the numerical value table stored at the ROM 26. As a result, a uniform scanning area can be obtained by the radar apparatus employing the self-oscillation circuit as well.

Figure 14:
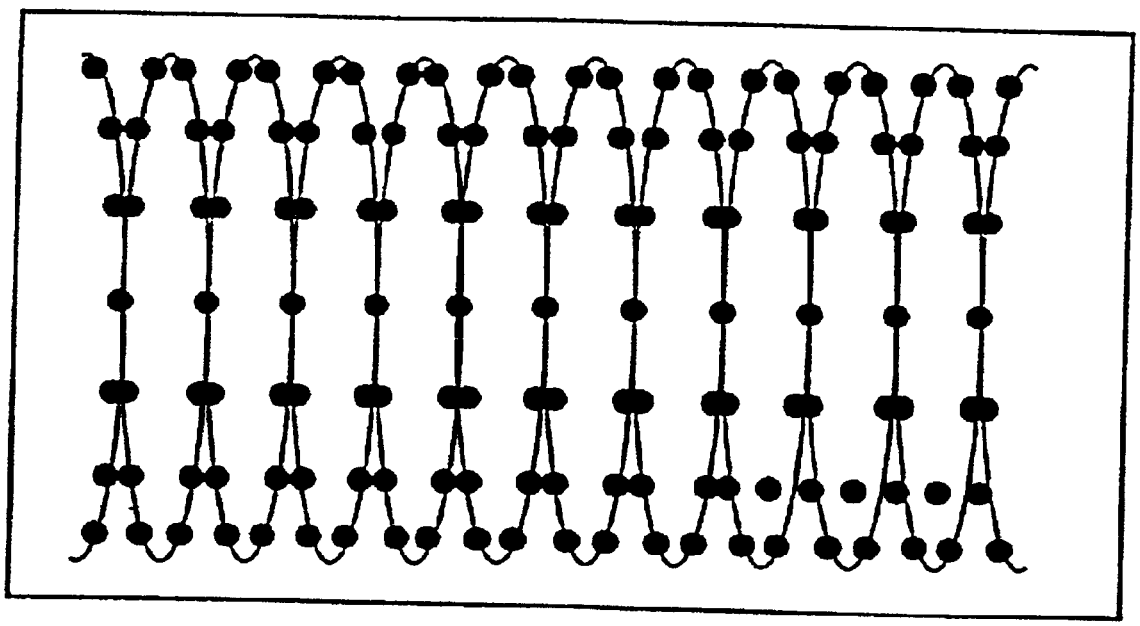
FIG. 14 presents the results of a scanning operation performed through Lissajous scanning in the radar apparatus according to the present invention.
Figure 26:
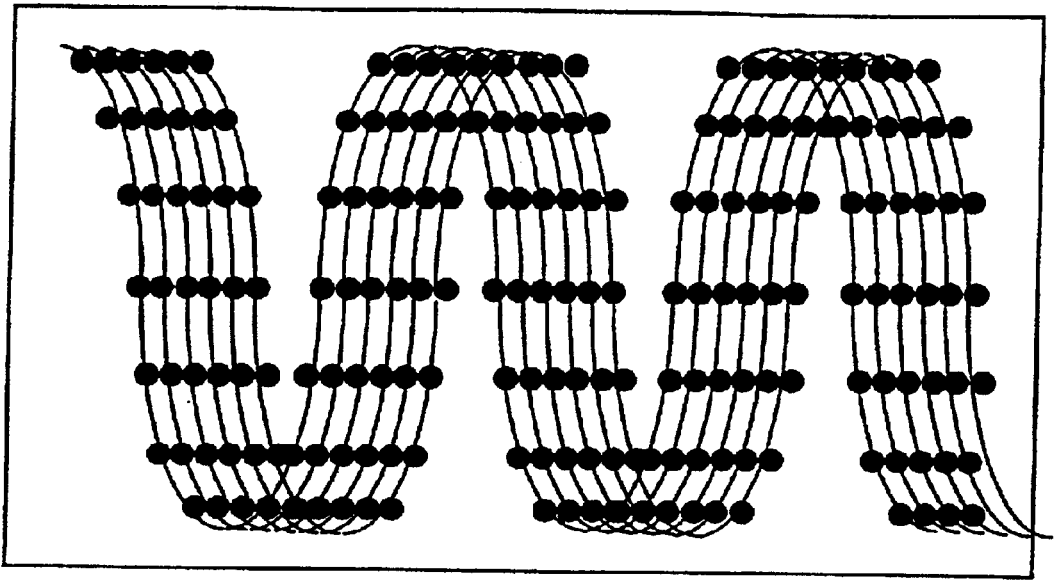
FIG. 26 shows the results of a scanning operation performed in a radar apparatus in the related art through Lissajous scanning.
Figure 27:
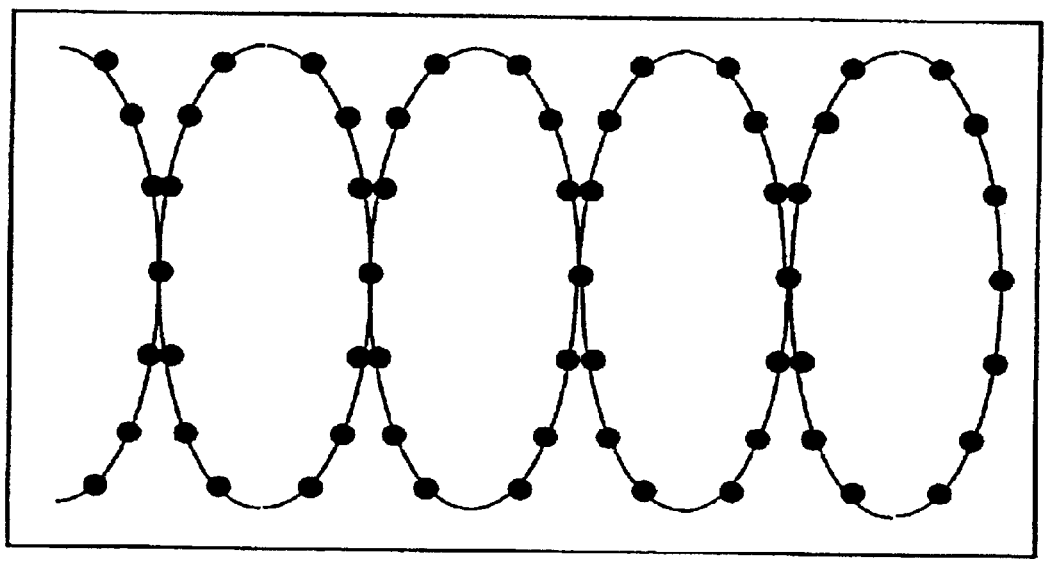
FIG. 27 shows the results of a scanning operation performed in a radar apparatus in the related art through Lissajous scanning.

The results of a two-dimensional scan performed in a radar apparatus according to the present invention through Lissajous scanning which is sinusoidal scanning are presented in FIG. 14. Unlike in the scanning operation performed by utilizing a radar apparatus in the related art, the results of which are presented in FIGS. 26 and 27, a uniform scanning is achieved within the scan area both along the longitudinal direction and the lateral direction. The number of partitions into which the scanning area is divided along the longitudinal direction, i.e., the number of measurement points along the longitudinal direction, can be varied by controlling the number of light emission pulses emitted by the laser diode 7. In other words, the number of partitions along the longitudinal direction can be raised by increasing the number of light emission pulses to achieve even more accurate measurement.

In addition, by setting the length of time intervals over which pulse light is emitted to a value which is 1/integer of the cycle of the longitudinal drive frequency, the number of partitions of the scanning area along the longitudinal direction can be set uniformly for the entire scanning area. For instance, by setting the length of time intervals over which the pulse light is emitted to 1/40 of the cycle of the wave motion (drive signal) with the longitudinal drive frequency f1, the number of partitions into which the scanning area is divided along the longitudinal direction is set to 21. Likewise, the number of partitions into which the scanning area is divided along the lateral direction, too, can be varied by controlling the number of light emission pulses. For instance, by setting the length of time intervals over which the pulse light is emitted to 1/400 of the cycle of the wave motion with the lateral drive frequency f2, the number of partitions along the lateral direction is set to 201. However, since the longitudinal drive frequency f1 and the lateral drive frequency f2 are controlled so as to achieve the relationship expressed as |m·f1−n·f2|=1/T, the time intervals over which the pulse light is emitted is not set both the longitudinal direction and the lateral direction as described above at the same time.

Fourth Embodiment

Figure 15:
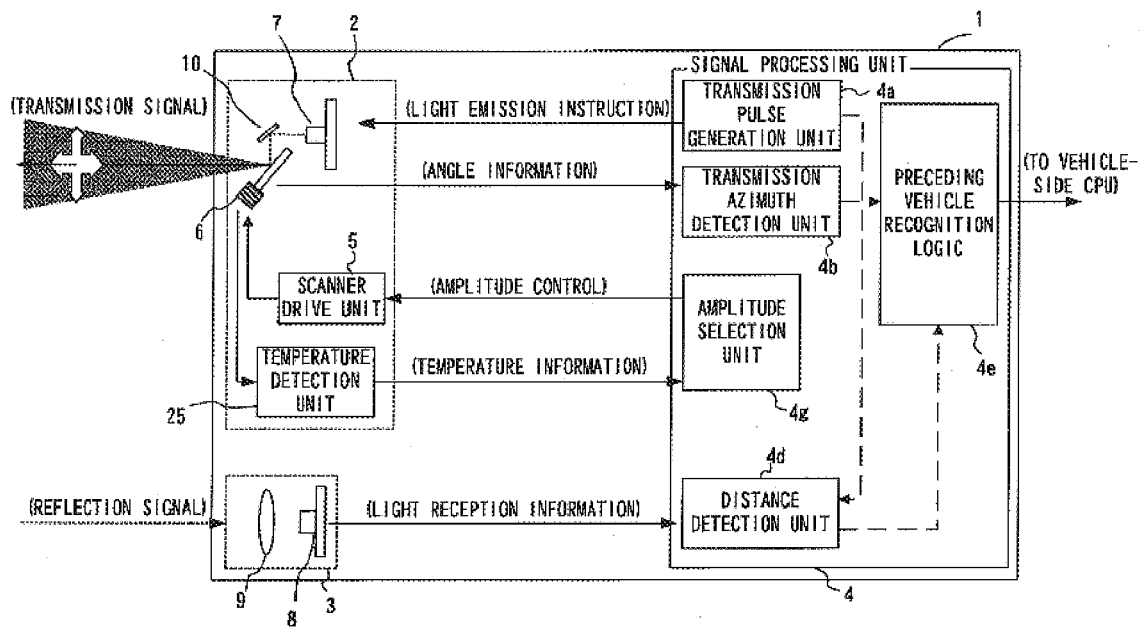
FIG. 15 shows the structure achieved in a fourth embodiment of the radar apparatus according to the present invention.

FIG. 15 shows the structure achieved in the fourth embodiment of the radar apparatus according to the present invention. The same reference numerals are assigned to components identical to those of the radar apparatus in the first embodiment to preclude the necessity for a repeated explanation thereof. The radar apparatus in the fourth embodiment includes an amplitude selection unit 4g in place of the frequency selection unit 4c provided in the first embodiment. Namely, the drive of the scanner 6 is primarily controlled through amplitude control in the radar apparatus in the fourth embodiment.

Figure 16:
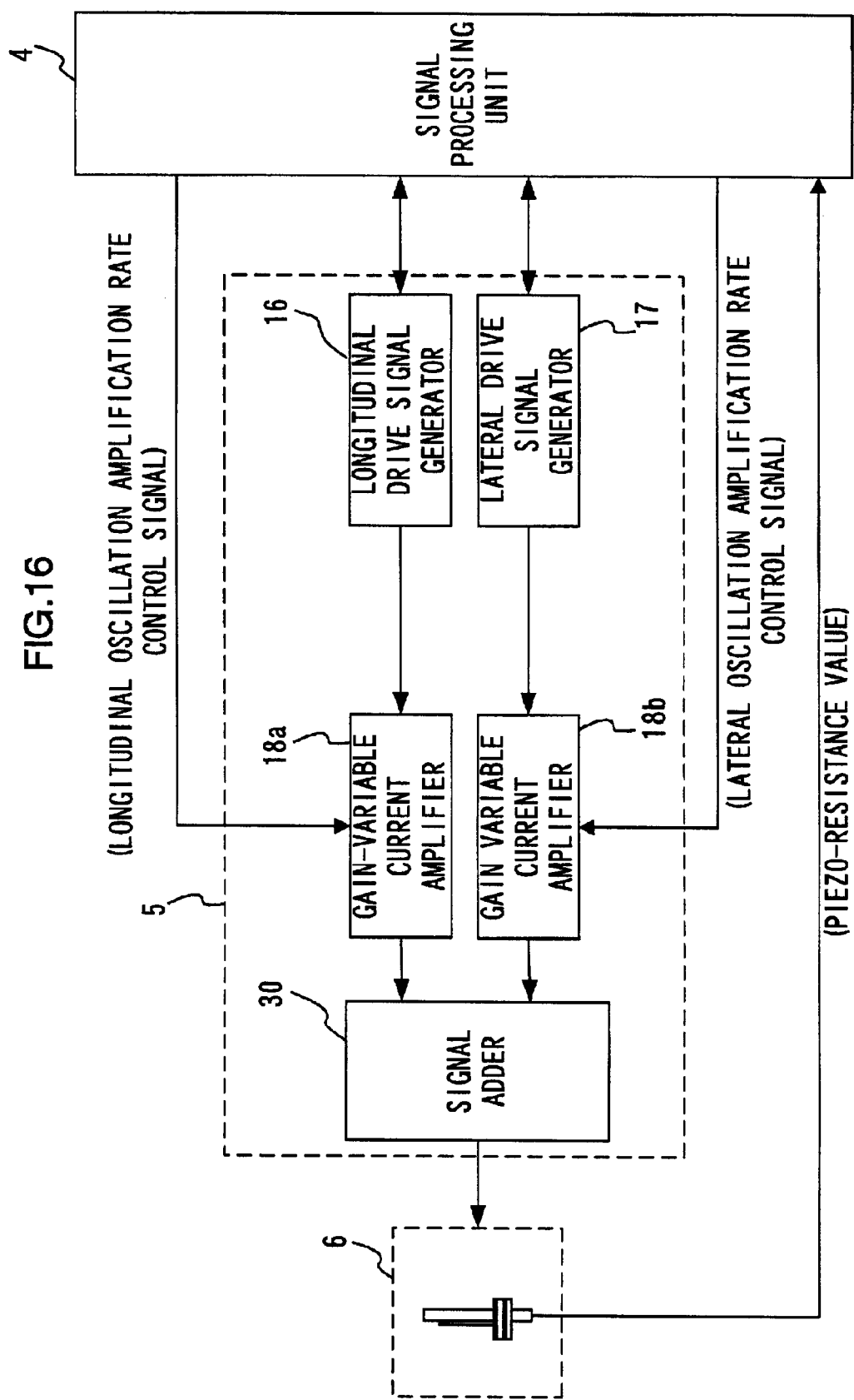
FIG. 16 shows the structure of the scanner drive unit adopted in the fourth embodiment of the radar apparatus according to the present invention.

FIG. 16 shows the structure of a scanner drive unit 5. The scanner drive unit 5 includes a longitudinal drive signal generator 16, a lateral drive signal generator 17, gain-variable current amplifiers (hereafter referred to as current amplifiers) 18a and 18b and a signal adder 30. The sine wave of a longitudinal drive signal oscillated by the longitudinal drive signal generator 16 is output to the current amplifier 18a in response to a control signal input from the signal processing unit 4. Likewise, the sine wave of a lateral drive signal oscillated by the lateral drive signal generator 17 is output to the current amplifier 18b in response to a control signal input from the signal processing unit 4. The current amplifiers 18a and 18b respectively amplify the signals at individual drive frequencies input thereto at the corresponding amplification rates set based upon oscillation amplification rate control signals provided by the signal processing unit 4. The amplified signals are added together at the signal adder 30 and the resulting signal is provided to the scanner 6. Consequently, the scanner 6 is allowed to oscillate the scanner 6 in a desirable manner along the longitudinal direction and the lateral direction.

The signal processing unit 4 implements control so as to change the amplitude of the drive signal with a lower frequency among the longitudinal drive signal and the lateral drive signal by providing control signals to the current amplifiers 18a and 18b in the scanner drive unit 5. A function which sets the length of the scanning observation period to at least a half cycle is used in the amplitude control. More specifically, amplitude control whereby the amplification rate is linearly increased or reduced within the scanning observation period or amplitude control achieved by using a sign function in which the scanning the observation period is set to a single cycle is implemented. The scanning observation period as referred to in this context refers to the length of time required to scan a predetermined size of two-dimensional scanning area.

With A1·sin(ω1·t+α) representing the longitudinal drive signal, A2·sin (ω2·t+β) representing the lateral drive signal and T representing the scanning observation period, a longitudinal drive signal V(t) and a lateral drive signal H(t) resulting from the amplitude modulation are indicated as in expressions (3)~(6). It is assumed that the frequency of the lateral drive signal is lower than that of the longitudinal drive signal. Expressions (3) and (4) represent the results obtained by using a linear function, whereas the expressions (5) and (6) represent the results obtained by using a sine function. It is to be noted that in the following explanation, the amplitude modulation implemented by using the linear function is referred to as a linear modulation and the amplitude modulation implemented by using the sine function is referred to as a sine modulation.

Linear Modulation $$V(t)=A1 \cdot \sin(\omega 1 \cdot t+\alpha) \tag{3}$$

$$H(t)=(t-n \cdot T)/T \cdot A2 \cdot \sin(\omega 2 \cdot t+\beta) \tag{4}$$

with n representing an integer that satisfies T>t−n·T>0

Sine Modulation $$V(t)=A1 \cdot \sin(\omega 1 \cdot t+\alpha) \tag{5}$$

$$H(t)=\sin(2\pi t/T) \cdot A2 \cdot \sin(\omega 2 \cdot t+\beta) \tag{6}$$

Through the amplitude modulation described above, any formation of an area where observation points are set sparsely in the scanning area can be prevented. However, a sparse area may be partially formed in the scanning area even when an amplitude modulation has been implemented through either the linear modulation or the sine modulation described above if the ratio of the frequency of the longitudinal drive signal and the frequency of the lateral drive signal is an odd number. In particular, the presence of such a sparse area becomes more pronounced if the frequencies of the longitudinal drive signal and the lateral drive signal are equal to each other. For this reason, if the ratio of the frequency of the longitudinal drive signal and the frequency of the lateral drive signal is an odd number, the phase difference between the longitudinal drive signal and the lateral drive signal is set to 90° to prevent the occurrence of a sparse area within the scanning area.

Figure 17:
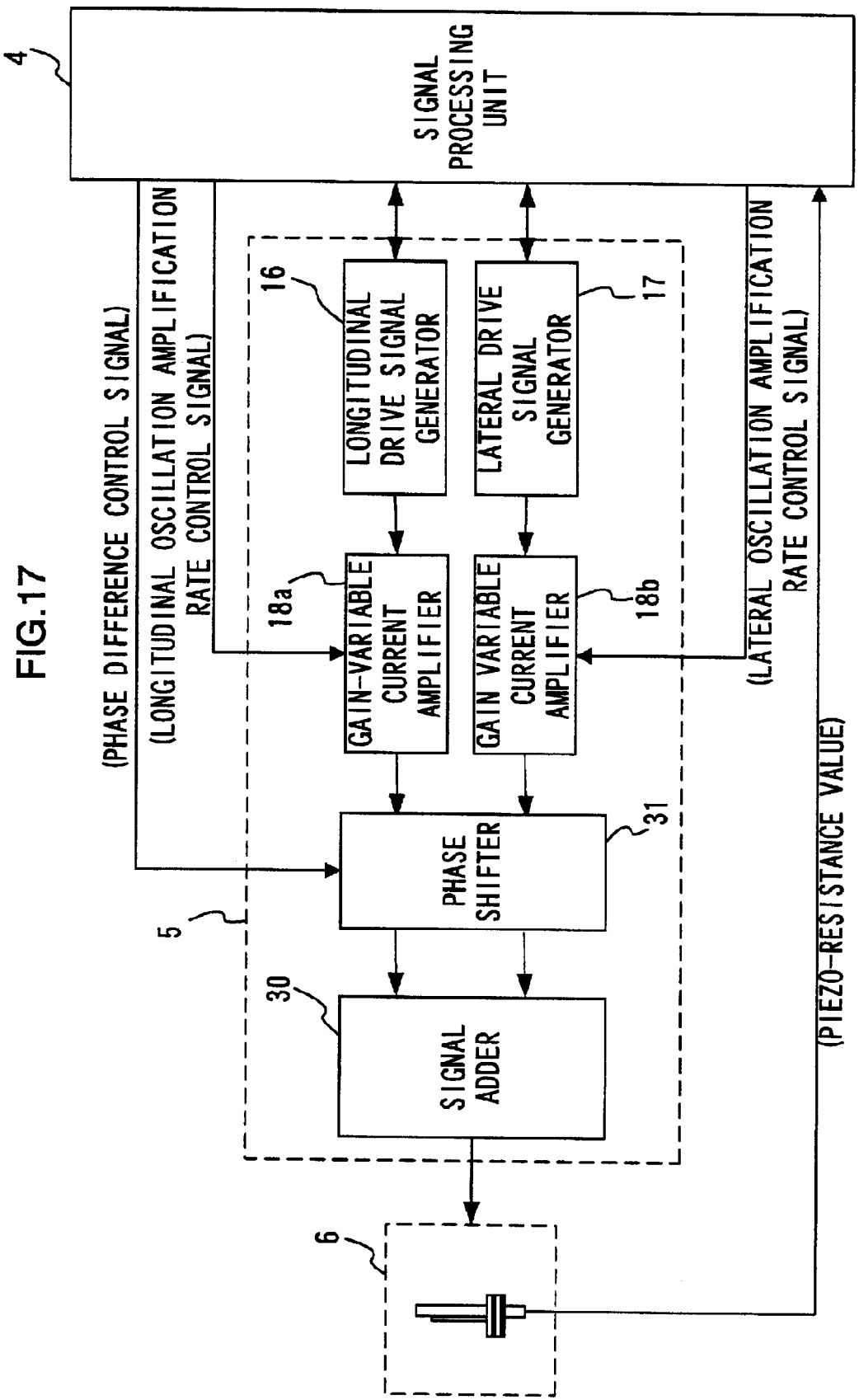
FIG. 17 shows another structure that may be adopted in the scanner drive unit utilized in the radar apparatus in the fourth embodiment of the present invention.

The scanner drive unit 5 assumes the structure illustrated in FIG. 17 in order to enable a phase difference adjustment. Namely, a phase shifter 31 is added to the scanner drive unit 5 shown in FIG. 16. The following explanation is given by assuming that the scanner drive unit 5 adopts the structure shown in FIG. 17.

When it is judged that the ratio of the frequencies of the longitudinal drive signal and the lateral drive signal is an odd number in the signal processing unit 4, a phase difference control signal is transmitted to the phase shifter 31. The phase shifter 31 selects 90° as the phase difference to be achieved by the longitudinal drive signal and the lateral drive signal provided from the current amplifiers 18a and 18b respectively and outputs both drive signals to the signal adder 30. By performing a phase difference adjustment on the amplitude modulation results obtained using expressions (3)~(6), the results as indicated in the following expressions (3a)~(6a) are achieved.

Linear Modulation $$V(t)=A1 \cdot \sin(\omega 1 \cdot t+\alpha) \tag{3a}$$

$$H(t)=(t-n \cdot T)/T \cdot A2 \cdot \sin(\omega 2 \cdot t+\alpha \pm \pi/2) \tag{4a}$$

with n representing an integer that satisfies T>t−n·T>0.

Sine Modulation $$V(t)=A1 \cdot \sin(\omega 1 \cdot t+\alpha) \tag{5a}$$

$$H(t)=\sin(2\pi t/T) \cdot A2 \cdot \sin(\omega 2 \cdot t+\alpha \pm \pi/2) \tag{6a}$$

Figure 18:
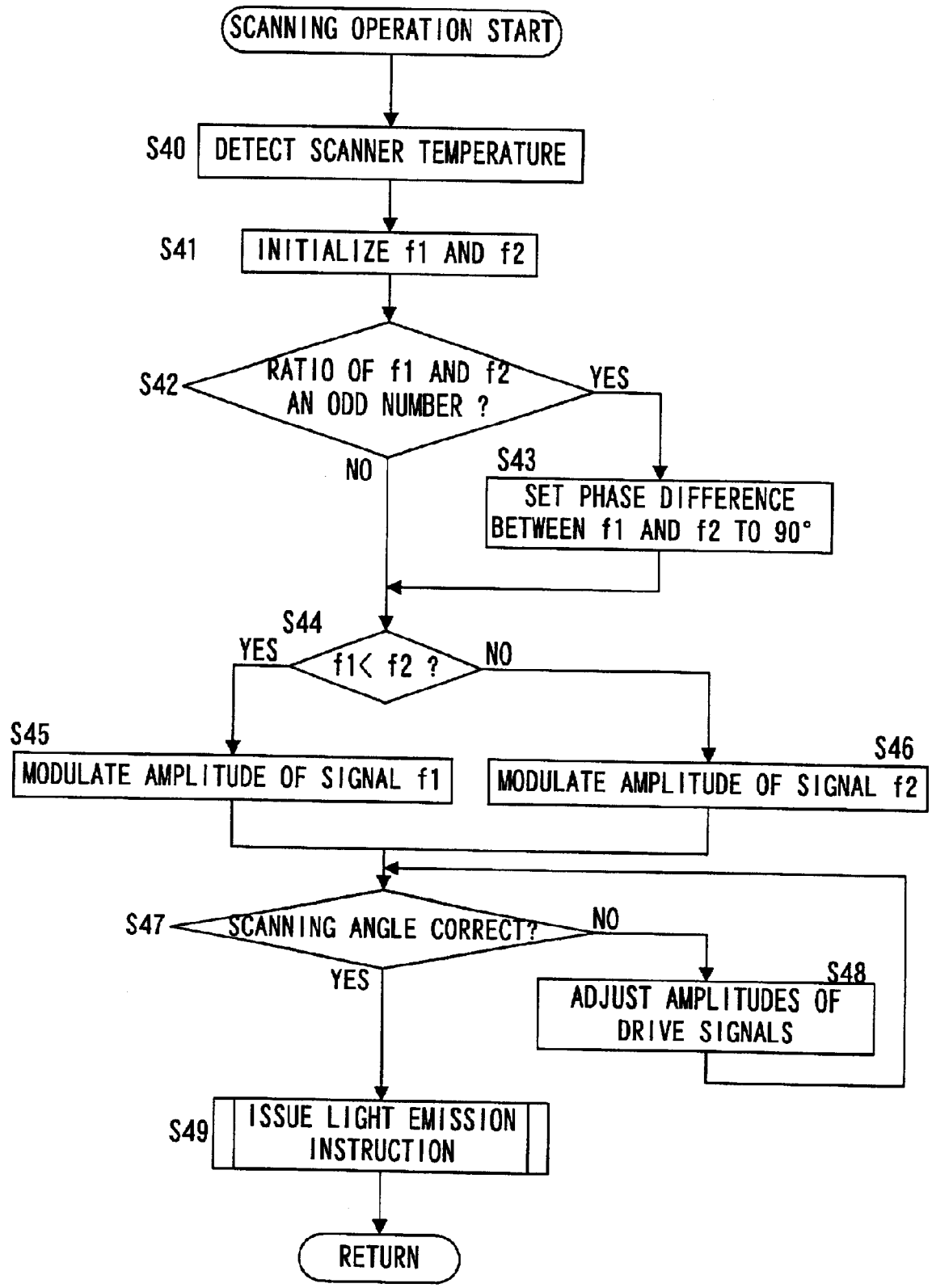
FIG. 18 presents a flowchart of the control procedure implemented in the fourth embodiment of the radar apparatus according to the present invention.

FIG. 18 presents a flowchart of an embodiment of the control procedure implemented by the signal processing unit 4 in the radar apparatus according to the present invention. The processing in step S40 and subsequent steps is started as a scanning start instruction signal is input to the signal processing unit 4. In step S40, the temperature of the scanner 6 is detected by the scanner temperature detection unit 25. Once the temperature of the scanner 6 is detected, the operation proceeds to step to S41. In step S41, the longitudinal drive frequency f1 and the lateral drive frequency f2 at which the scanner 6 is to be driven are both set to their initial values close to the resonance frequency of the scanner 6. The value of the resonance frequency of the scanner 6 has been corrected in conformance to the temperature of the scanner 6 detected in step S40.

After setting the longitudinal drive frequency f1 and the lateral drive frequency f2 to their initial values close to the resonance frequency of the scanner 6 in step S41, the operation proceeds to step S42. In step S42, it is judged as to whether or not the ratio of the longitudinal drive frequency f1 and the lateral drive frequency f2 is an odd number. If it is judged that the ratio is an odd number, the operation proceeds to step S43, whereas if it is judged that it is not an odd number, the operation proceeds to step S44. In step S43, a phase difference control signal for setting the phase difference between the longitudinal drive frequency f1 and the lateral drive frequency f2 to 90° is provided to the phase shifter 31 in the scanner drive unit 5, before the operation proceeds to step S44. Upon receiving the phase difference control signal, the phase shifter 31 sets the phase difference between the longitudinal drive frequency f1 and the lateral drive frequency f2 to 90°.

In step S44, it is judged as to whether or not the longitudinal drive frequency f1 is lower than the lateral drive signal f2. If it is judged that the longitudinal drive frequency f1 is lower than the lateral drive signal f2, the operation proceeds to step S45, whereas if it is judged that the lateral drive frequency f2 is lower than the longitudinal drive frequency f1, the operation proceeds to step S46. In step S45, an amplitude modulation is implemented on the amplitude of the longitudinal drive signal by using a function in which the scanning observation period is set to at least a half cycle and then the operation proceeds to step S47. In step S46, on the other hand, an amplitude modulation is implemented on the amplitude of the lateral drive signal using a function in which the scanning observation period is set to at least a half cycle, before the operation proceeds to step S47. In the amplitude modulation implemented in step S45 or step S46, the linear modulation or the sine modulation explained earlier should be executed.

In step S47, it is judged as to whether or not the direction along which the pulse light is emitted, i.e., the scanning angle, is correct. This judgment may be made by detecting the resistance value of the piezo-resistance film 13. If it is judged that the scanning angle is correct, i.e., if it is judged that the scanning angle is within a predetermined angle range, the operation proceeds to step S49, whereas if it is judged that the scanning angle is not correct, the operation proceeds to step S48. In step S48, the amplitudes of the longitudinal drive signal and/or the lateral drive signal are adjusted before the operation returns to step S47. In step S49, a light emission instruction is issued from the transmission pulse generating unit 4a to the laser diode 7 in the signal transmitter unit 2. In response to the light emission instruction, the laser diode 7 emits pulse light, thereby starting a two-dimensional scan.

In the control procedure explained above, the temperature of the scanner 6 is detected (step S40), and then the longitudinal drive frequency f1 and the lateral drive frequency f2 at which the scanner 6 is to be driven are both set to their initial values close to the resonance frequency of the scanner 6 which has been corrected in conformance to the scanner temperature (step S41). If the ratio of the longitudinal drive frequency f1 and the lateral drive frequency f2 is an odd number, the phase difference between the longitudinal drive frequency f1 and the lateral drive frequency f2 is set to 90° (step S42~step S43). Then, by implementing an amplitude modulation on the drive signal with a lower frequency using a function in which the scanning observation period is set to at least a half cycle (step S44~step S46), the two-dimensional observation can be executed while preventing the formation of an area in which observation points are set sparsely within the two-dimensional scanning observation area.

Following the transmission of the light emission instruction from the transmission pulse generating unit 4a in step S49, pulse light is emitted from the laser diode 7 and thus a range finding operation starts. However, the resonance frequency of the scanner 6 may shift after the range finding operation starts due to a change in the ambient temperature. For this reason, it is necessary to adjust the drive conditions of the scanner 6 in conformance to the change in the resonance frequency of the scanner 6 in order to execute an observation within a specific two-dimensional scanning area. The method adopted to achieve such control is now explained in reference to the control flowchart presented in FIG. 19.

Figure 19:
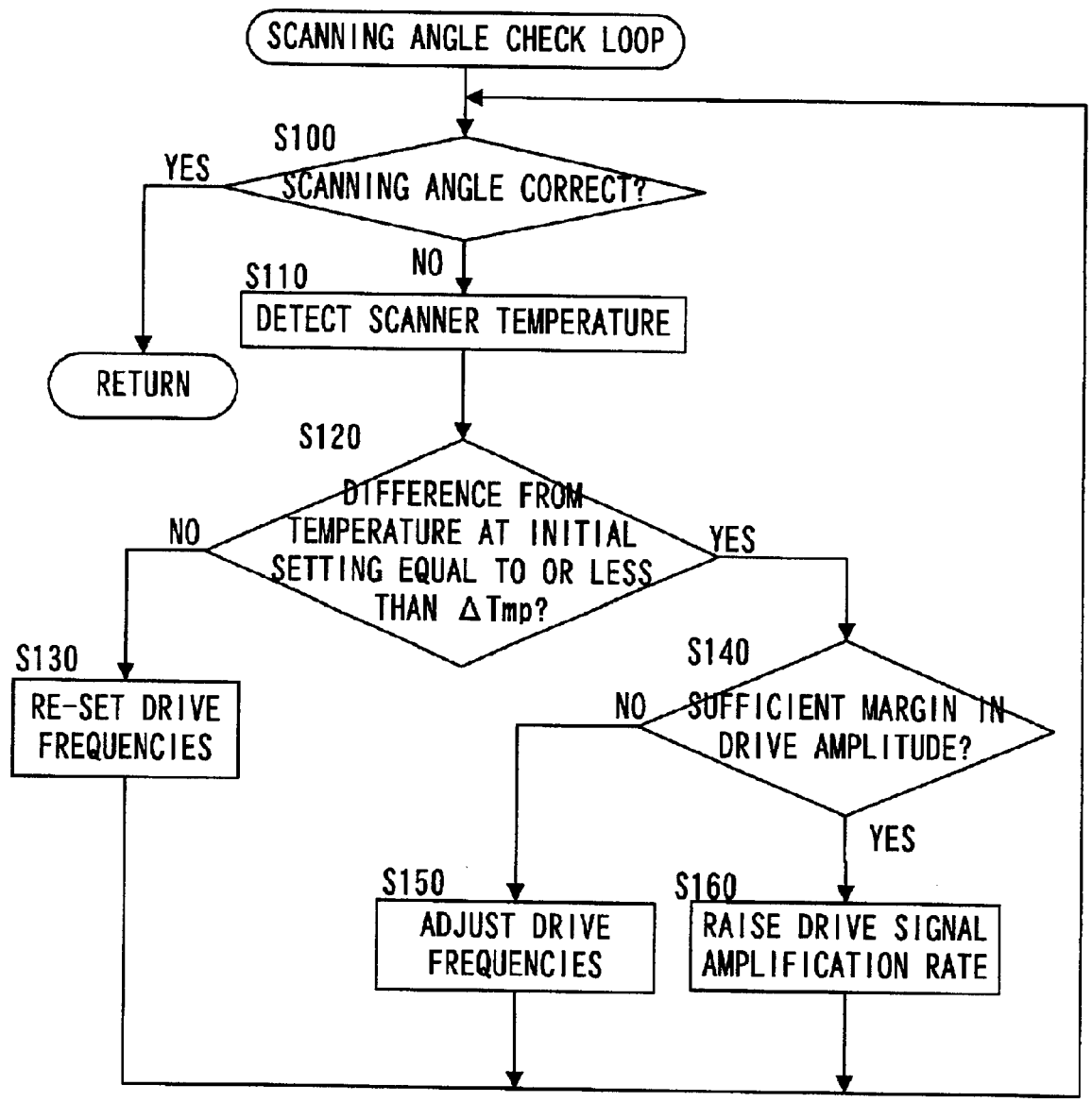
FIG. 19 presents a flowchart of the control procedure implemented when the radar apparatus in the fourth embodiment performs a scanning angle adjustment.

The control shown in the flowchart in FIG. 19 is implemented as appropriate following the range finding operation start. Namely, the range finding operation is started following the transmission of the light emission instruction in step S49 in the flowchart in FIG. 18, and the control is subsequently implemented as appropriate. The control may be implemented over predetermined time intervals or it may be implemented before or after a specific control procedure is implemented each time. The following is an explanation given in conformance to the sequence of the control starting in step S100.

In step S100, it is judged as to whether or not the direction along which the pulse light is emitted, i.e., the scanning angle, is correct. This judgment may be made by detecting the resistance value of the piezo-resistance film 13. If it is judged that the scanning angle is correct, the control ends and the range finding operation is carried on. If, on the other hand, it is judged that the scanning angle is not correct, the operation proceeds to step S110. In step S110, the temperature of the scanner 6 is detected by the scanner temperature detection unit 25. Once the temperature of the scanner 6 is detected, the operation proceeds to step S120.

In step S120, it is judged as to whether or not the difference $\Delta t$ between the temperature of the scanner 6 detected when the drive frequencies were set to the initial values, i.e., the temperature detected in step S40 in the flowchart presented in FIG. 18, and the temperature of the scanner 6 detected in step S110 is equal to or smaller than the predetermined value $\Delta Tmp$. If it is judged that the temperature change $\Delta t$ is equal to or less than a predetermined value $\Delta Tmp$, the operation proceeds to step S140, whereas if it is judged that the temperature change $\Delta t$ is larger than the predetermined value $\Delta Tmp$, the operation proceeds to step S130. In step S130, to which the operation proceeds if the temperature of the scanner 6 has changed greatly, the longitudinal and lateral drive frequencies are re-set without implementing any fine adjustment on the drive frequencies or any amplitude modulation. In other words, the longitudinal and lateral drive frequencies are re-set based upon the temperature detected in step S110, and then the operation returns to step S100.

In step S140, it is judged as to whether or not there is a sufficient margin with regard to the amplitude amplification rate of the drive signal. Namely, since the scanning observation is executed within a limited area and thus the amplitude amplification rate for the drive signal is subject to some restrictions, it is judged as to whether or not there is a sufficient margin in the amplitude amplification rate by comparing the current amplitude amplification rate against a predetermined limit. If it is judged that there is sufficient margin in the amplitude amplification rate, the operation proceeds to step S160, whereas if it is judged that there is not sufficient margin, the operation proceeds to step S150. In step S150, to which the operation proceeds if the amplitude of the drive signal cannot be adjusted, the longitudinal drive frequency f1 and the lateral drive frequency f2 are individually adjusted, and then the operation returns to step S100. In step S160, on the other hand, the amplitude amplification rate of the drive signal is raised before the operation returns to step S100.

In the control procedure shown in the flowchart in FIG. 19, in which the amplitude amplification rate for the drive signal or the drive frequencies are adjusted as necessary even when the resonance frequency has fluctuated due to change in the temperature of the scanner 6 following the range finding operation start, any formation of an area in which observation points are set sparsely or densely within the two-dimensional observation area can be prevented to achieve a uniform scan within the observation area.

Figure 20:
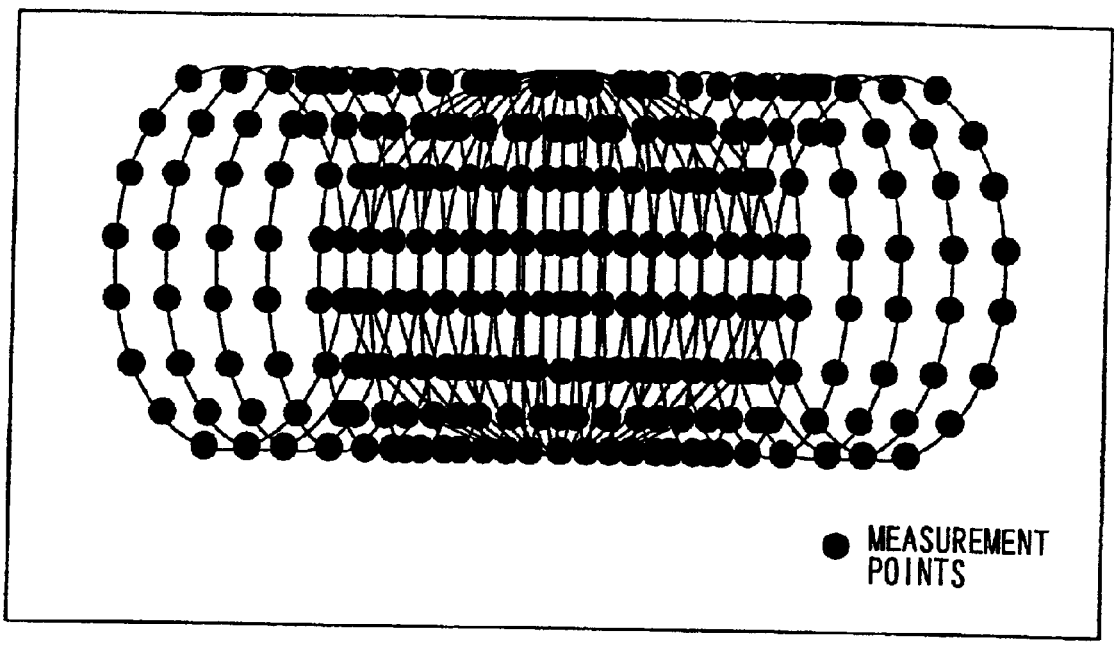
FIG. 20 presents the results of a scanning operation performed through Lissajous scanning in the radar apparatus achieved in the fourth embodiment.

FIG. 20 presents the results of a two-dimensional scan achieved through Lissajous scanning which is sinusoidal scanning by using the radar apparatus in the fourth embodiment of the present invention. As a comparison of the results presented in FIG. 20 with the results of the two-dimensional scan executed by using the radar apparatus in the related art presented in FIGS. 26 and 27 clearly demonstrates, a uniform scan is achieved both along the longitudinal direction and the lateral direction within the scanning area.

As in the radar apparatuses achieved in the first third embodiments, the number of partitions of the scanning area along the longitudinal direction, i.e., the number of measurement points along the longitudinal direction, can be varied by controlling the number of light emission pulses emitted from the laser diode 7. In addition, by setting the length of time intervals over which pulse light is emitted to 1/integer of the longitudinal drive cycle, uniformity is achieved in the number of partitions of the scanning area along the longitudinal direction over the entire scanning area. Likewise, the number of partitions of the scanning area along the lateral direction, too, can be varied by controlling the number of light emission pulses.

As described above, the radar apparatus achieved in the fourth embodiment, in which an amplitude modulation is implemented by using a function in which the scanning observation period is set to at least a half cycle on the signal with the lower frequency among the longitudinal oscillation signal or the lateral oscillation signal to be used to drive the scanner that executes a two-dimensional scan through longitudinal and lateral oscillations, achieves measurement results in which observation points are set uniformly without creating any area where observation points are set sparsely within the two-dimensional scanning area. The function used during the control procedure may be a linear function that uses the time as a parameter or a sine function in which the scanning observation period is set to a single cycle. In addition, if the ratio of frequencies of the longitudinal drive signal and the lateral drive signal is an odd number, the phase difference between the longitudinal drive signal and the lateral drive signal is set to 90°, which prevents any formation of a sparse area within the scanning area to achieve measurement results in which observation points are set uniformly.

Furthermore, since the longitudinal drive frequency and the lateral drive frequency are corrected in conformance to the scanner temperature, the scanning area is not allowed to become smaller due to a change in the scanner temperature. Moreover, uniformity is achieved in the number of partitions of the scanning area along the longitudinal direction by setting the length of time intervals over which pulse light is emitted to 1/integer of the cycle of the longitudinal drive signal and, likewise, uniformity is achieved in the number of partitions of the scanning area along the lateral direction by setting the length of time intervals over which pulse light is emitted to 1/integer of the cycle of the lateral oscillation signal.

Fifth Embodiment

Figure 21:
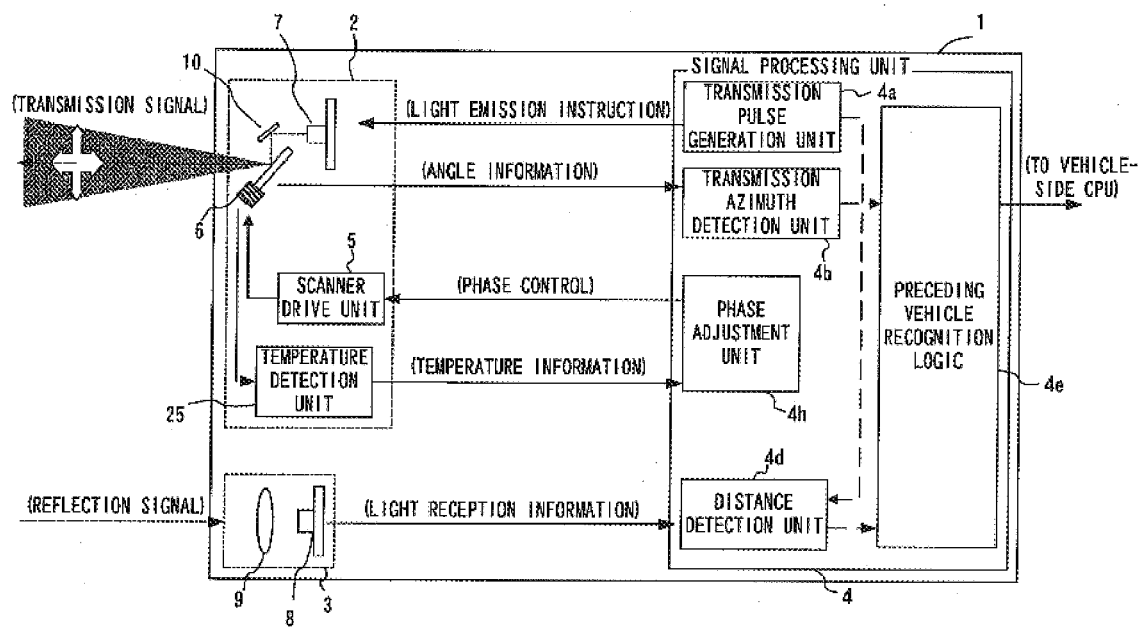
FIG. 21 shows the structure achieved in a fifth embodiment of the radar apparatus according to the present invention.

FIG. 21 shows the structure assumed in the fifth embodiment of the radar apparatus according to the present invention. The same reference numerals are assigned to components identical to those in the radar apparatus in the fourth embodiment to preclude the necessity for a repeated explanation thereof. The radar apparatus in the fifth embodiment differs from the radar apparatus in the fourth embodiment in its signal processing unit 4 and its scanner drive unit 5. The signal processing unit 4 in the radar apparatus in the fifth embodiment is provided with a phase adjustment unit 4h in place of the amplitude selection unit 4g to enable phase control on the drive signal used to drive the scanner 6. In other words, while a uniform scanning operation is achieved in the radar apparatus in the fourth embodiment by preventing any formation of a sparse area in the scanning area through the control implemented on the amplitude of the drive signal, the radar apparatus in the fifth embodiment realizes a uniform scan within the scanning area by controlling the drive signal phase.

Figure 22A:
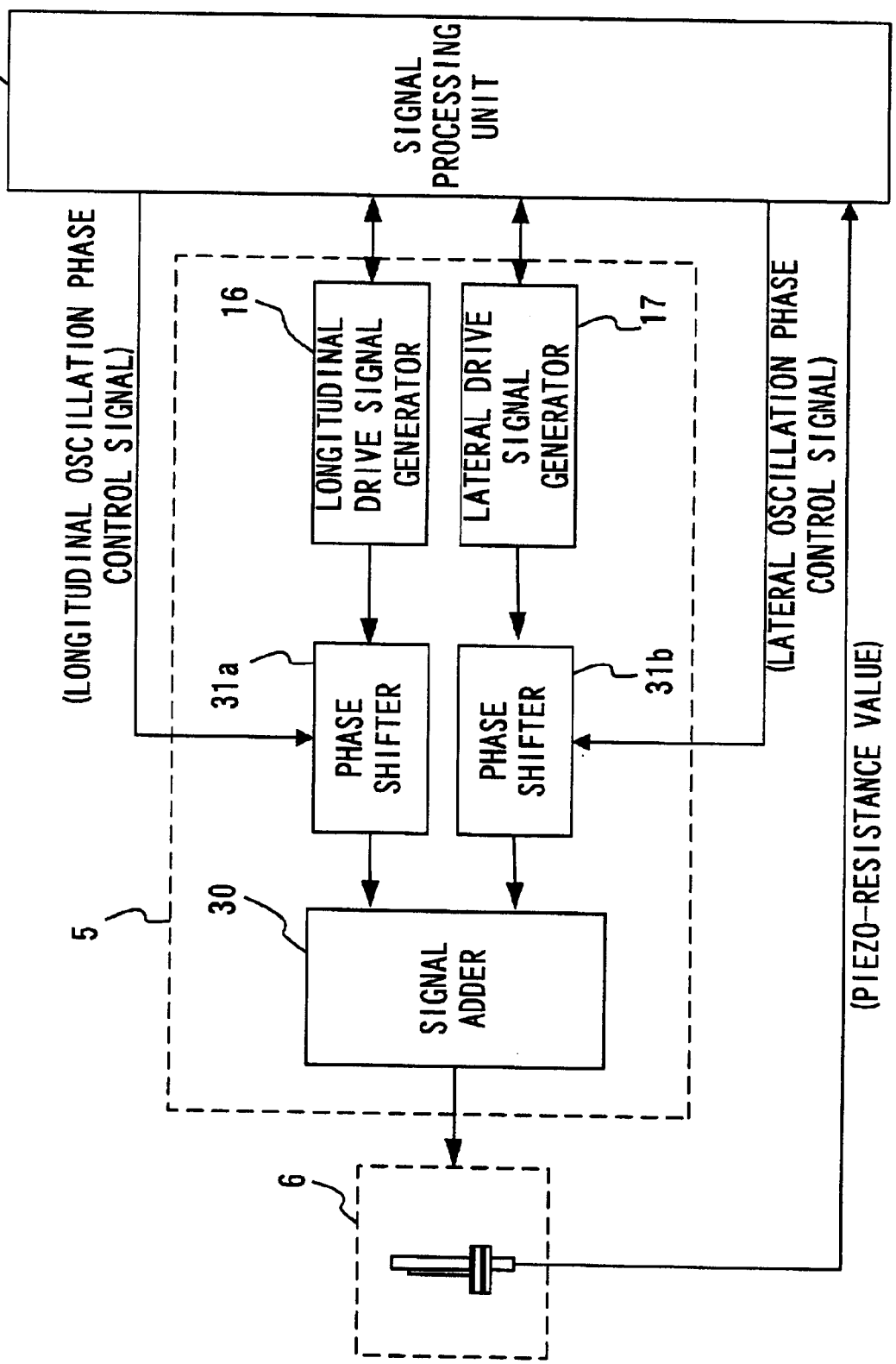
FIG. 22A shows a structure that may be adopted in the scanner drive unit utilized in the radar apparatus in the fifth embodiment and FIG. 22B shows another structure that may be adopted in the scanner drive unit employed in the radar apparatus in the fifth embodiment.

FIG. 22A shows the structure assumed in the scanner drive unit 5 in the radar apparatus in the fifth embodiment. The scanner drive unit 5 includes a longitudinal drive signal generator 16, a lateral drive signal generator 17, a signal adder 30 and phase shifters 31a and 31b. The sine wave of a longitudinal drive signal oscillated at the longitudinal drive signal generator 16 is output to the phase shifter 31a. The phase shifter 31a controls the phase of the longitudinal drive signal based upon a longitudinal oscillation phase control signal input from the phase adjustment unit 4h in the signal processing unit 4. Likewise, the sign wave of a lateral drive signal oscillated at the lateral drive signal generator 17 is output to the phase shifter 31b where its phase is controlled based upon a lateral oscillation amplitude rate control signal input from the phase adjustment unit 4h. The lateral drive signal having undergone the phase control is output to the signal adder 30. The signal adder 30 adds the longitudinal drive signal and the lateral drive signal input thereto and then provides the resulting signal to the scanner 6.

Figure 22B:
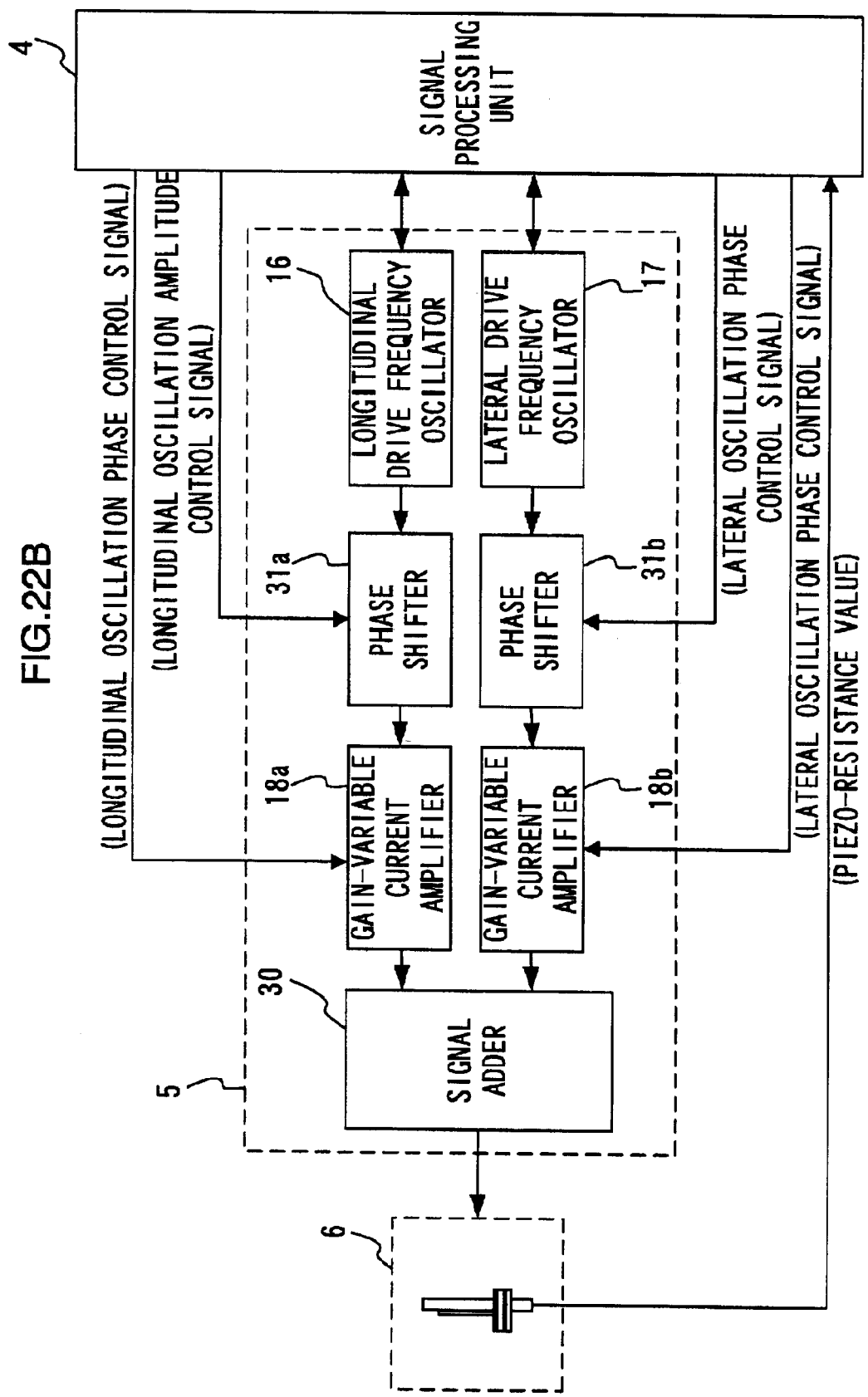

FIG. 22B shows a structure achieved in a variation of the scanner drive unit 5 in the radar apparatus achieved in the fifth embodiment. The structure of the scanner drive unit 5 shown in FIG. 22B is achieved by adding gain-variable amplifiers 18a and 18b to the structure of the scanner drive unit 5 shown in FIG. 22A. Accordingly, the longitudinal drive signal having undergone phase control at a phase shifter 31a is provided to the gain-variable amplifier 18a. At the gain-variable amplifier 18a, amplitude control is implemented on the longitudinal drive signal based upon a longitudinal signal amplitude control signal provided from the signal processing unit 4. The lateral drive signal, too, is transmitted from a phase shifter 31b to the gain-variable amplifier 18b to undergo amplitude control. The individual drive signals having undergone the amplitude control are then output to the signal adder 30.

The method adopted to achieve the phase control is now explained. The initial frequency settings of the longitudinal drive signal and the lateral drive signal are both values close to the resonance frequency of the scanner 6. With the phase control signals provided to the phase shifters 31a and 31b of the scanner drive unit 5 from the phase adjustment unit 4f in the signal processing unit 4, phase control is executed to increase or decrease the phase of the longitudinal drive signal or the lateral drive signal by a predetermined extent. With $A1 \cdot \sin(\omega 1 \cdot t + \alpha)$ representing the longitudinal drive signal, $A2 \cdot \sin(\omega 2 \cdot t + \beta)$ representing the lateral drive signal and T representing the scanning observation period, the longitudinal drive signal V(t) and the lateral drive signal H(t) having undergone the phase control are respectively as indicated in expressions (7) and (8). It is assumed, however, that the frequency of the lateral drive signal is lower than the frequency of the longitudinal drive signal and that the phase of the lateral drive signal is changed.

$$V(t) = A1 \cdot \sin(\omega 1 \cdot t + \alpha) \quad (7)$$

$$H(t) = A2 \cdot \sin[\omega 2 t + \beta - (180/m) \text{int}\{(t - n \cdot T)/m\}/T] \quad (8)$$

with n representing an integer that satisfies T>t−n·T>0, m representing the largest integer equal to or smaller than 10 whose value is neither an integral multiple of $\omega 1/\omega 2$ or 1/integer of $\omega 1/\omega 2$ and int(X) representing a function for extracting the integral part of X.

If the frequency of the longitudinal drive signal is lower than the frequency of the lateral drive signal and the phase of the longitudinal drive signal is changed, on the other hand, the longitudinal drive signal V(t) and the lateral drive signal H(t) having undergone the phase control are respectively indicated as in expressions (9) and (10).

$$V(t) = A1 \cdot \sin[\omega 1 \cdot t + \alpha - (360/m) \cdot \text{int}\{(t - n \cdot T)/m\}/T] \quad (9)$$

$$H(t) = A2 \cdot \sin(\omega 2 \cdot t + \beta) \quad (10)$$

with n representing an integer that satisfies T>t−n·T>0, m representing the largest integer equal to or smaller than 10 whose value is neither an integral multiple of $\omega 1/\omega 2$ or 1/integer of $\omega 1/\omega 2$ and int(X) representing a function for extracting the integral part of X. It is to be noted that the time intervals over which the phases of the longitudinal drive signal and the lateral drive signal are changed should both be a value obtained by dividing the scanning observation period T by the integer m.

In other words, when controlling the phase of the signal with the lower frequency among the longitudinal drive signal and the lateral drive signal, the extent to which the phase is changed should be represented by a value obtained by dividing 180° by the largest integer m equal to or smaller than 10 which is neither an integral multiple or 1/integer of the ratio of the longitudinal drive signal and the lateral drive signal, whereas when controlling the phase of the signal with the higher frequency, the extent to which the phase is changed should be represented by a value obtained by dividing 360° by the integer m. Thus, since the phase of the longitudinal drive signal or the lateral drive signal is to be changed by at least 180° during the scanning observation period, any formation of an area in which observation points are set sparsely within the two-dimensional scanning area is prevented to enable a uniform scanning operation.

FIG. 23 presents a flowchart of the procedure of the control implemented by the signal processing unit 4 in the radar apparatus in the fifth embodiment. The same step numbers are assigned to steps in which processing identical to that shown in the flowchart in FIG. 18 is implemented and the following explanation focuses on the processing implemented in the fifth embodiment which is different from that in the fourth embodiment. The processing in step S40 and subsequent steps is started as a scan start instruction signal is input to the signal processing unit 4. In step S40, the temperature of the scanner 6 is detected by the scanner temperature detection unit 25. Once the temperature of the scanner 6 is detected, the operation proceeds to step to S41. In step S41, the longitudinal drive frequency f1 and the lateral drive frequency f2 at which the scanner 6 is to be driven are both set to the initial values close to the resonance frequency of the scanner 6. The value of the resonance frequency of the scanner 6 has been corrected in conformance to the temperature of the scanner 6 detected in step S40.

Once the longitudinal drive frequency f1 and the lateral drive frequency f2 are initialized in step S41, the operation proceeds to step S200. In step S200, the ratio of the longitudinal drive frequency f1 and the lateral drive frequency f2 is first calculated and then the largest integer equal to or smaller than 10 whose value is neither an integral multiple or 1/integer of f1/f2 is set for the variable m. This variable m is utilized for the phase control on the longitudinal/lateral drive signal (see expression (8) or (9) above). When the variable m is set, the operation proceeds to step S44.

In step S44, it is judged as to whether or not the longitudinal drive frequency f1 is lower than the lateral drive frequency f2. If it is judged that the longitudinal drive frequency f1 is lower than the lateral drive frequency f2, the operation proceeds to step S210, whereas if it is judged that the lateral drive frequency f2 is lower than the longitudinal drive frequency f1, the operation proceeds to step S220. In step S210, control is implemented to change the phase of the longitudinal drive signal by 180/m (°) over a T/m(sec) time interval, before the operation proceeds to step S47. In step S220, on the other hand, control is implemented to change the phase of the lateral drive signal by 180/m (°) over a T/m(sec) time interval, before the operation proceeds to step S47.

In step S47, it is judged as to whether or not the direction along which the pulse light is emitted, i.e., the scanning angle, is correct. This judgment may be made by detecting the resistance value of the piezo-resistance film 13. If it is judged that the scanning angle is correct, the operation proceeds to step S49, whereas if it is judged that the scanning angle is not correct, the operation proceeds to step S48. In step S48, the amplitudes of the longitudinal drive signal and/or the lateral drive signal are adjusted before the operation returns to step S47. In step S49, a light emission instruction is issued from the transmission pulse generating unit 4a to the laser diode 7 in the signal transmitter unit 2. In response to the light emission instruction, the laser diode 7 emits pulse light, thereby starting a two-dimensional scan.

In the radar apparatus in the fifth embodiment, a two-dimensional scan is started through the procedure summarized below. First, the temperature of the scanner 6 is detected (step S40), and then the longitudinal drive frequency f1 and the lateral drive frequency f2 at which the scanner 6 is to be driven are set to their initial values close to the resonance frequency of the scanner 6 having been corrected in conformance to the scanner temperature (step S41). The ratio of the longitudinal drive frequency f1 and the lateral drive frequency f2 is calculated and the variable m to be used for the phase control is set to the largest integer equal to or smaller than 10 whose value is neither an integral multiple or 1/integer of f1/f2 (step S200). Then, the frequencies of the longitudinal drive signal and the lateral drive signal are compared with each other (step S44) and the phase control is implemented on the drive signal with the lower frequency to change its phase by $\pi/m$ over a T/m time interval (step S210 or S220). As a result, a two-dimensional observation can be executed while preventing any formation of an area in which observation points are set sparsely within the two-dimensional scanning observation area.

In addition, the control procedure shown in the flowchart in FIG. 19 is implemented following the range finding operation start, as in the first embodiment. Namely, as the range finding operation is started in response to a pulse light emission from the laser diode 7 following the transmission of a light emission instruction from the transmission pulse generating unit 4a in step S49, the resonance frequency of the scanner 6 may shift after the range finding operation start due to a change in the ambient temperature or the like and, for this reason, control is implemented to adjust the drive conditions of the scanner 6 in conformance to the change in the resonance frequency of the scanner 6. An explanation of the control in the flowchart in FIG. 19, which has already been explained, is omitted.

Figure 24:
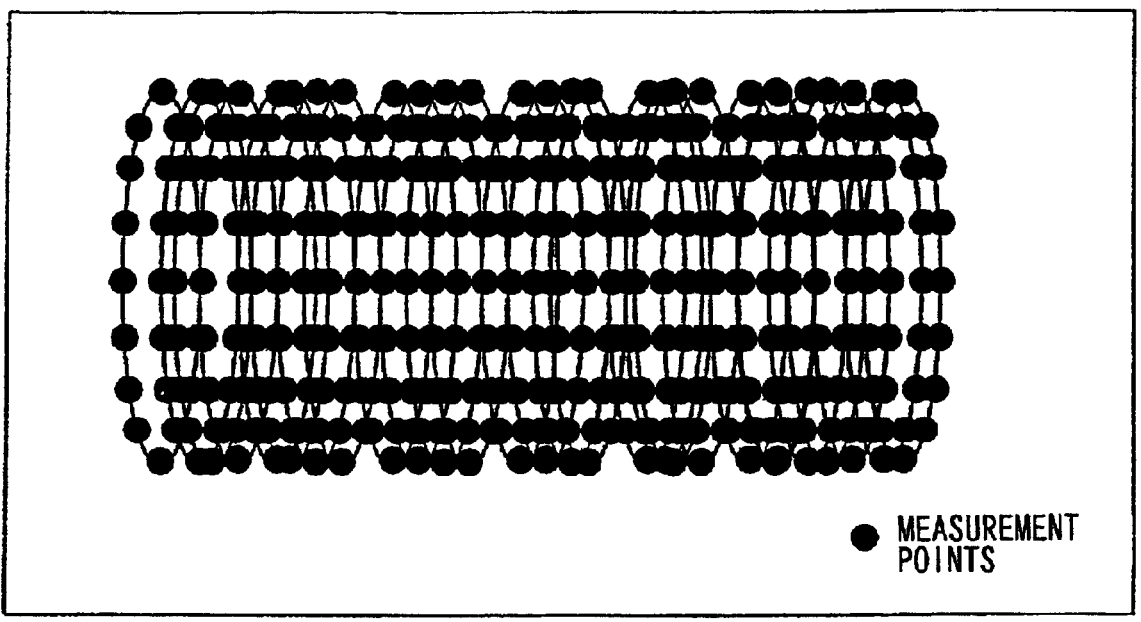
FIG. 24 presents the results of a scanning operation performed through Lissajous scanning in the radar apparatus achieved in the fifth embodiment.

FIG. 24 presents the results of a two-dimensional scan achieved through Lissajous scanning which is sinusoidal scanning by using the radar apparatus in the fifth embodiment of the present invention. As a comparison of the results presented in FIG. 24 with the results of the two-dimensional scan executed by using the radar apparatus in the related art presented in FIGS. 26 and 27 clearly demonstrates, a uniform scan is achieved both along the longitudinal direction and the lateral direction within the scanning area.

As in the radar apparatuses achieved in the first~fourth embodiments, the number of partitions of the scanning area along the longitudinal direction can be varied by controlling the number of light emission pulses emitted from the laser diode 7. In addition, by setting the length of time intervals over which pulse light is emitted to 1/integer of the cycle of the longitudinal drive signal, uniformity is achieved in the number of partitions of the scanning area along the longitudinal direction over the entire scanning area. Likewise, the number of partitions of the scanning area along the lateral direction, too, can be varied by controlling the number of light emission pulses.

As described above, the radar apparatus in the fifth embodiment, in which the phase of the longitudinal drive signal or the lateral drive signal used to drive the scanner which executes a two-dimensional scan through longitudinal and lateral oscillations is changed to a specific extent over every specific time interval to change the phase by at least 180° within the scanning observation period, is capable of providing measurement results in which observation points are set uniformly without creating an area in which measurement points are set sparsely within the two-dimensional scanning area. The extent to which the phase is changed is represented by a value obtained by dividing 180° by the largest integer equal to or smaller than 10 that is neither an integral multiple or 1/integer of the ratio of the longitudinal drive signal and the lateral drive signal when controlling the phase of the signal with the lower frequency among the longitudinal drive signal and the lateral drive signal and is a value obtained by dividing 360° by the largest integer equal to or smaller than 10 that is neither an integral multiple or 1/integer of the ratio of the longitudinal drive signal and the lateral drive signal when controlling the phase of the signal with the higher frequency.

Furthermore, since the longitudinal oscillation frequency and the lateral oscillation frequency are corrected in conformance to the scanner temperature, the scanning area is not allowed to become smaller due to change in the scanner temperature. Moreover, uniformity is achieved in the number of partitions of the scanning area along the longitudinal direction by setting the length of time intervals over which pulse light is emitted to 1/integer of the cycle of the longitudinal drive signal and, likewise, uniformity is achieved in the number of partitions of the scanning area along the lateral direction by setting the length of time intervals over which pulse light is emitted to 1/integer of the cycle of the lateral drive signal.

Sixth Embodiment

The radar apparatus achieved in the sixth embodiment differs from the radar apparatuses in the fourth and fifth embodiments in the structure assumed in its scanner 6. Namely, in the radar apparatus in either the fourth embodiment or the fifth embodiment, the scanner device that two-dimensionally scans laser light along the longitudinal and lateral directions is constituted of a single-strut type micro-scanner, as illustrated in FIGS. 3A and 3B. In contrast, the radar apparatus in the sixth embodiment utilizes a double support type (double gimbal structure) micro-scanner, as shown in FIGS. 25A and 25B.

Figure 25A:
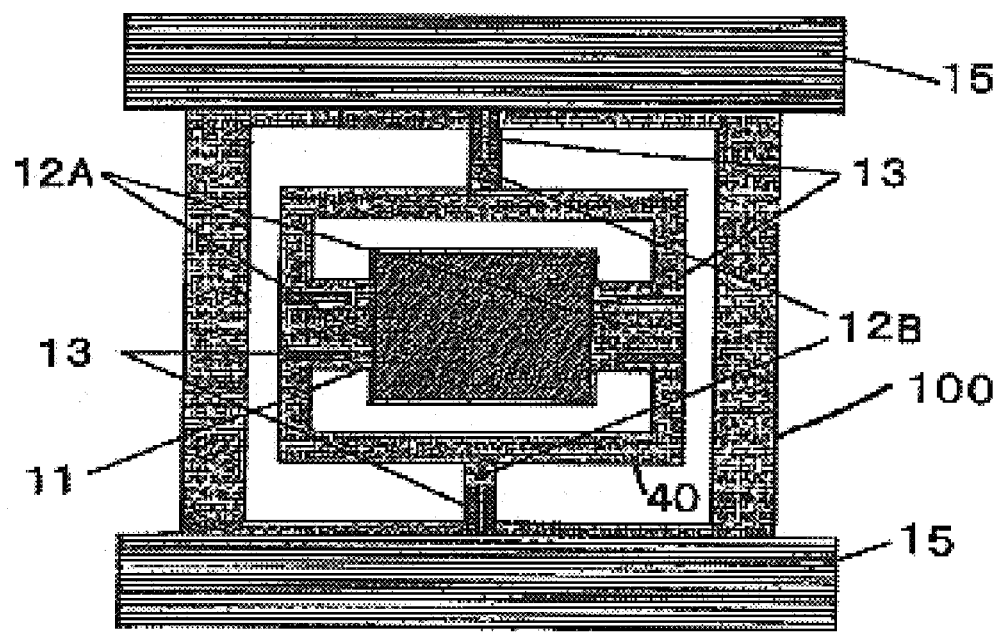
FIG. 25A shows the front surface of a double-hold microscanner.
Figure 25B:
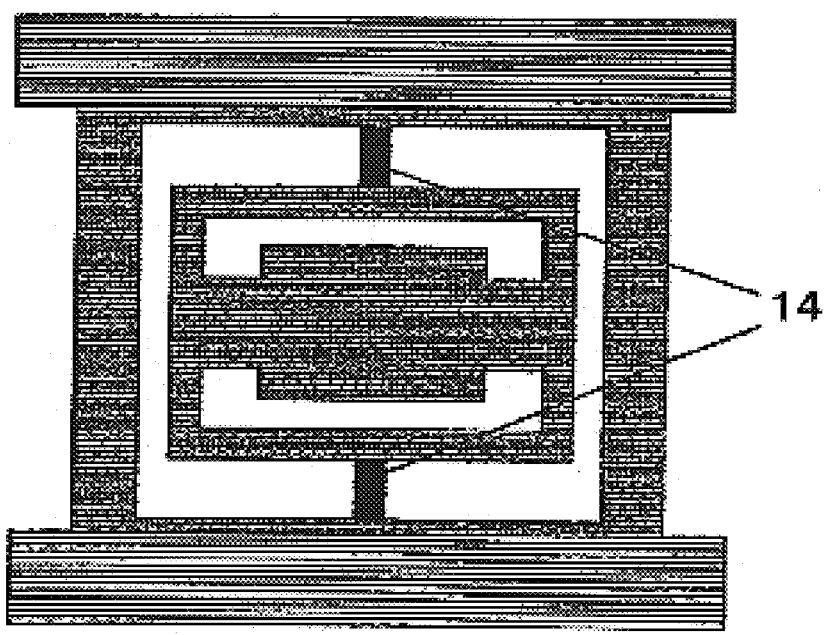
FIG. 25B shows the rear surface of the same microscanner.

FIG. 25A shows the front surface at which the mirror 11 is mounted and FIG. 25B shows the rear surface. The mirror 11 is supported by a mirror support portion 40 via two inner struts 12A on the both sides. The entire mirror support portion 40 including the inner struts 12A is supported by a base unit 100 so as to be enclosed by two outer struts 12B set perpendicular to the inner struts 12A.

At the front surfaces of the inner struts 12A and the outer struts 12B, piezo-resistance films 13, whose resistance values change as the struts become flexed or twisted, are formed. In addition, as shown in FIG. 25B, magnetostrictive films 14 achieving a uniform magnetic azimuth are formed at the rear surfaces of the outer struts 12B. Factors that may cause flexure, torsion at the struts 12A and 12B are to be detailed later. The transmission azimuth detection unit 4b in the signal processing unit 4 detects changes in the resistance values of the piezo-resistance films 13 and calculates the extents of flexure and torsion at the inner struts 12A and the outer struts 12B accordingly. Based upon the extents of flexure and torsion thus calculated, the angle of the mirror 11, i.e., the direction along which pulse light is emitted, can be detected.

Air-core coils 15 are wound around the outer struts 12B. The air-core coils 15 are provided to apply AC magnetic fields to the magnetostrictive films 14 vacuum-deposited on the rear surfaces of the outer struts 12B, and by supplying AC current to the air-core coils 15, AC magnetic fields can be applied to the outer struts 12B along directions offset from the magnetic azimuths of magnetostrictive films 14 by a predetermined angle. As a result, resonant oscillations of the flexure and the torsion occur at the outer struts 12B, which results in a two-dimensional oscillation occurring at the entire mirror support portion 40. However, since the mirror support portion 40 assumes a structure supported on both sides by the outer struts 12B, the amplitude of the flexural oscillation at the outer struts 12B is smaller than the amplitude of the torsional oscillation.

The flexural oscillation in this context refers to an oscillation along the vertical direction relative to a mirror support unit 40 shown in FIG. 25A whereas the torsional oscillation refers to an oscillation along the horizontal direction relative to the mirror support unit 30. For this reason, the flexural resonance frequency of the outer struts 12B is set to match the torsional residence frequency of the inner struts 12A. Since the inner struts 12A and the outer struts 12B are set perpendicular to each other, the flexural oscillation at the outer struts 12B can induce torsional oscillation at the inner struts 12A with a larger amplitude. By using the two torsional oscillations at the outer struts 12B and the inner struts 12A, a wide-angle two-dimensional scan is realized.

The operation achieved by the scanner shown in FIGS. 25A and 25B is now explained. A torsional oscillation in which the two outer struts 12B are twisted along a single direction is induced in order to scan the mirror 11 along the horizontal direction in FIG. 25A at the front surface of the scanner. Namely, by applying torsion to the outer strut 12B on the lower side in the figure to the right when twisting the upper outer struts 12B in the figure to the right, a horizontal scan is achieved. In addition, a flexural oscillation in which the two outer struts 12B are flexed along different directions from each other is induced to scan the mirror 11 along the vertical direction in the figure. Namely, the outer strut 12B on the lower side in the figure is flexed further inward in the figure when the upper outer strut 12B is flexed closer to the surface of the sheet of paper upon which the drawing is presented to realize a vertical scan.

The radar apparatus in the sixth embodiment is characterized by the structure assumed in the scanner 6. Accordingly, any formation of an area where observation points are set sparsely within the two-dimensional observation area may be prevented by adjusting the amplitude of a drive signal used to drive the scanner 6 as in the radar apparatus in the first embodiment or by implementing a phase modulation to adjust the phase of a drive signal as in the radar apparatus in the second embodiment. In other words, the signal processing unit 4 implements either the control shown in the flowchart in FIG. 18 or the control shown in the flowchart in FIG. 23.

The above described embodiments are examples, and various modifications can be made without departing from the spirit and scope of the invention. For instance, while the magnetostrictive film 14 is utilized to drive the scanner 6 in the embodiments described above, the scanner 6 may be driven through an electrostatic method, a piezoelectric method, an electromagnetic method or the like. In addition, the present invention may be adopted in conjunction with radar apparatuses other than the laser radar that uses infrared light, including a laser radar that uses visible light, a radio radar that uses radio waves and an ultrasonic radar that uses ultrasonic waves.

The disclosures of the following priority applications are herein incorporated by reference:

Japanese Patent Application No. 2001-116525 filed Apr. 16, 2001

Japanese Patent Application No. 2001-246416 filed Aug. 15, 2001

Japanese Patent Application No. 2001-374742 filed Dec. 7, 2001

What is claimed is:

1. A radar apparatus comprising:
   a signal transmitter device that transmits a signal;
   a scanner that two-dimensionally scans a target object using the signal transmitted from said signal transmitter device by oscillating in longitudinally and laterally;
   a signal receiver device that receives a reflection signal which is originally transmitted via said scanner; and
   a control device that controls a longitudinal oscillation signal and a lateral oscillation signal used to oscillate said scanner longitudinally and laterally in correspondence to the length of time over which a scanning observation is performed through a two-dimensional scan, wherein
   said control device controls a frequency of the longitudinal oscillation signal and a frequency of the lateral oscillation signal so that cycles of beats constituted of the longitudinal oscillation signal and the lateral oscillation signal are set to 1/integer of the scanning observation period.

2. A radar apparatus according to claim 1, wherein:
   said control device sets the longitudinal oscillation frequency and the lateral oscillation frequency so as to satisfy a relational expression $|m \cdot f1 - n \cdot f2| = 1/T$ (m and n each representing an integer), with f1 representing the longitudinal oscillation frequency, f2 representing the lateral oscillation frequency and T representing the scanning observation period of said scanner.

3. A radar apparatus according to claim 2, wherein:
   the integers m and n in the relational expression are relatively prime.

4. A radar apparatus according to claim 1, wherein:
   a time interval over which said signal transmitter device transmits a signal is 1/integer of a longitudinal oscillation cycle of said scanner.

5. A radar apparatus according to claim 1, wherein:
   a time interval over which said signal transmitter device transmits a signal is 1/integer of a lateral oscillation cycle of said scanner.

6. A radar apparatus according to claim 2, wherein:
   said control device judges as to whether or not a scanner angle is correct at least once while said scanner is engaged in a two-dimensional scan and adjust one of the longitudinal oscillation frequency and the lateral oscillation frequency by ensuring that the longitudinal oscillation frequency and the lateral oscillation frequency satisfy the relational expression if it is judged that the scanning angle is not correct.

7. A radar apparatus according to claim 1,
   said control device control the longitudinal oscillation frequency and the lateral oscillation frequency after implementing control on amplitudes of the wave motion with the longitudinal oscillation frequency and the wave motion with the lateral oscillation frequency by adjusting a drive magnetic field, in consideration of a hard spring effect.

8. A radar apparatus according to claim 1, further comprising:
   a self-oscillation circuit that induces a self-excited resonance at said scanner, wherein:
   said control device controls the longitudinal oscillation frequency and the lateral oscillation frequency in a magnetic field area where a hard spring effect manifests by individually controlling target amplitudes for the wave motion with the longitudinal oscillation frequency and the wave motion with the lateral oscillation frequency.

9. A radar apparatus according to claim 1, further comprising:
   a temperature detection device that detects a temperature of said scanner, wherein:
   the longitudinal oscillation frequency and the lateral oscillation frequency are corrected based upon the temperature detected by said temperature of said scanner, wherein:
   the longitudinal oscillation frequency and the lateral oscillation frequency are corrected based upon the temperature detected by said temperature detection device.

10. A radar apparatus according to claim 1, wherein:
the signal output from said signal transmitter device is infrared pulse light.

11. A radar apparatus comprising:
a signal transmission means for transmitting a signal;
a scanner that two-dimensionally scans a target object using the signal transmitted from said signal transmission means by oscillating longitudinally and laterally;
a signal reception means for receiving a reflection signal which is originally transmitted via said scanner; and
a control means for controlling a longitudinal oscillation signal and a lateral oscillation signal used to oscillate said scanner longitudinally and laterally in correspondence to the length of time over which a scanning observation is performed through a two-dimensional scan, wherein:
said control means controls a frequency of the longitudinal oscillation signal and a frequency of the lateral oscillation signal so that cycles of beats constituted of the longitudinal oscillation signal and the lateral oscillation signal are set to 1/integer of the scanning observation period.

* * * * *